United States Patent
Kwon et al.

(10) Patent No.: US 11,226,735 B2
(45) Date of Patent: Jan. 18, 2022

(54) ELECTRONIC DEVICE FOR TRANSMITTING MESSAGE AND METHOD FOR OPERATING SAME

(71) Applicant: SAMSUNG ELECTRONICS CO., LTD., Suwon-si (KR)

(72) Inventors: Bang-Hyun Kwon, Gumi-si (KR); Jeong-Hoon Kim, Gumi-si (KR); Hye-Soon Jeong, Gyeongsangbuk-do (KR); Yeun-Wook Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/108,488

(22) Filed: Aug. 22, 2018

(65) Prior Publication Data

US 2019/0065046 A1  Feb. 28, 2019

(30) Foreign Application Priority Data

Aug. 22, 2017  (KR) .......................... 10-2017-0106353

(51) Int. Cl.
*G06F 3/0488* (2013.01)
*G06F 3/01* (2006.01)
(Continued)

(52) U.S. Cl.
CPC ........ *G06F 3/04886* (2013.01); *G06F 1/1698* (2013.01); *G06F 3/017* (2013.01);
(Continued)

(58) Field of Classification Search
CPC .. G06F 3/04886; G06F 3/04883; G06F 3/017; G06F 3/0346; G06F 1/1698; H04M 1/72555; H04M 2250/22; H04M 1/72439
See application file for complete search history.

(56) References Cited

U.S. PATENT DOCUMENTS

| | | | |
|---|---|---|---|
| 2006/0128407 A1* | 6/2006 | Kim | H04N 1/00106 455/466 |
| 2007/0016689 A1* | 1/2007 | Birch | G06Q 30/02 709/241 |

(Continued)

FOREIGN PATENT DOCUMENTS

| | | |
|---|---|---|
| KR | 10-2011-0115357 | 10/2011 |
| KR | 10-2013-0094401 | 8/2013 |

OTHER PUBLICATIONS

Soffar, "Animated GIFs (Graphic Interchange Format) Advantages and Disadvantages", (Feb. 3, 2017), <URL: http://www.online-sciences.com/computer/animated-gifs-graphic-interchange-format-advantages-and-disadvantages/>, p. 1-8 (Year: 2017).*

(Continued)

*Primary Examiner* — Mong-Shune Chung
(74) *Attorney, Agent, or Firm* — Nixon & Vanderhye P.C.

(57) ABSTRACT

An electronic device is disclosed. The electronic device may include a housing; a touchscreen display exposed through a portion of the housing; a wireless communication circuit disposed in the housing; a processor electrically connected to the touchscreen display and the wireless communication circuit; and a memory electrically connected to the processor and configured to store an application including a user interface for transmitting a message through the wireless communication circuit, wherein the memory stores at least one instruction that, when executed by the processor, causes the electronic device to: display the user interface of the application on the touchscreen display; display a virtual keyboard with the user interface and/or to overlap the user interface; receive a first input through the virtual keyboard; hide the virtual keyboard and display a drawing pad with the user interface and/or to overlap the user interface upon receiving the first input; receive a second input through the drawing pad; obtain an image file based on the second input;

(Continued)

change the image file based on at least some of information on the application; and transmit the changed image file through the wireless communication circuit to an external electronic device.

19 Claims, 26 Drawing Sheets

(51) Int. Cl.
G06F 1/16 (2006.01)
G06F 3/0346 (2013.01)
H04M 1/72439 (2021.01)

(52) U.S. Cl.
CPC ........ G06F 3/0346 (2013.01); G06F 3/04883 (2013.01); H04M 1/72439 (2021.01); H04M 2250/22 (2013.01)

(56) References Cited

U.S. PATENT DOCUMENTS

| | | | |
|---|---|---|---|
| 2008/0141150 A1 | 6/2008 | Kalaboukis et al. | |
| 2009/0098893 A1 | 4/2009 | Huang | |
| 2011/0183691 A1* | 7/2011 | Kwon | H04M 1/72555 455/466 |
| 2013/0038613 A1* | 2/2013 | Kim | G06T 9/00 345/473 |
| 2013/0215151 A1* | 8/2013 | Chang | G11B 27/3027 345/636 |
| 2014/0059449 A1 | 2/2014 | Kim et al. | |
| 2014/0086105 A1 | 3/2014 | Kang et al. | |
| 2015/0089389 A1* | 3/2015 | Cohen-Zur | H04W 4/12 715/752 |
| 2015/0339524 A1* | 11/2015 | Yang | G06F 3/04883 382/189 |
| 2016/0037167 A1* | 2/2016 | Wen | H04N 19/139 375/240.07 |
| 2016/0062541 A1 | 3/2016 | Anzures et al. | |
| 2016/0266783 A1* | 9/2016 | Lee | H04L 51/18 |
| 2016/0285808 A1* | 9/2016 | Franklin | H04L 51/16 |
| 2017/0102871 A1* | 4/2017 | Won | G06F 3/04886 |
| 2018/0013876 A1* | 1/2018 | Kim | H04M 1/72415 |
| 2018/0113609 A1* | 4/2018 | Gnedin | G06F 3/04883 |
| 2019/0268291 A9* | 8/2019 | Molina | H04L 41/22 |

OTHER PUBLICATIONS

Search Report and Written Opinion dated Nov. 28, 2018 in counterpart International Patent Application No. PCT/KR2018/009687.
European Search Report dated May 19, 2020 for European Application No. 18847589.1.

* cited by examiner

ELECTRONIC DEVICE FOR TRANSMITTING MESSAGE AND METHOD FOR OPERATING SAME

CROSS-REFERENCE TO RELATED APPLICATION(S)

This application is based on and claims priority under 35 U.S.C. § 119 to Korean Patent Application Serial No. 10-2017-0106353, which was filed in the Korean Intellectual Property Office on Aug. 22, 2017, the disclosure of which is incorporated by reference herein in its entirety.

BACKGROUND

1. Field

The present disclosure relates to an electronic device for transmitting an image file, and a method for controlling the same.

2. Description of Related Art

Electronic devices can transmit text messages through a message application to exchange information. Technological development enables electronic devices to transmit and share not only text messages but also pictures and videos with each other. Electronic devices can exchange, for example, images and videos created personally by a user via a particular application through a messenger application.

When a user transmits and shares an image file personally obtained through a particular application, the obtained image file is subject to the particular application or a particular operating system and thus may not be compatible with another application or another operating system.

SUMMARY

According to various example embodiments, an electronic device may encode the obtained image file into a format suitable for any application using information on the particular application. Accordingly, the image file may be available on various applications.

An electronic device according to various example embodiments may include: a housing; a touchscreen display exposed through a portion of the housing; a wireless communication circuit disposed in the housing; a processor electrically connected to the touchscreen display and the wireless communication circuit; and a memory electrically connected to the processor and configured to store an application including a user interface for transmitting a message through the wireless communication circuit, wherein the memory stores instructions that, when executed by the processor, cause the electronic device to: display the user interface of the application on the touchscreen display; display a virtual keyboard with the user interface and/or to overlap the user interface; receive a first input through the virtual keyboard; hide the virtual keyboard; display a drawing pad with the user interface and/or to overlap the user interface upon receiving the first input; receive a second input through the drawing pad; obtain an image file based on the second input; change the image file based on at least some of information on the application; and transmit the changed image file through the wireless communication circuit.

An electronic device according to various example embodiments may include: a housing; a touchscreen display exposed through a portion of the housing; a wireless communication circuit disposed in the housing; a processor electrically connected to the touchscreen display and the wireless communication circuit; and a memory electrically connected to the processor and configured to store an application including a user interface for transmitting a message through the wireless communication circuit, wherein the memory stores instructions that, when executed by the processor, cause the electronic device to: receive a first input; display a drawing pad in response to the first input; receive a second input through the drawing pad; obtain an image file based on the second input; receive a third input of selecting the application to share the image file; change the image file based on at least some of information on the application; and transmit the changed image file through the wireless communication circuit to an external electronic device.

A method for operating an electronic device according to various example embodiments may include: displaying a user interface of an application on a touchscreen display; displaying a virtual keyboard with the user interface and/or to overlap the user interface; receiving a first input through the virtual keyboard; hiding the virtual keyboard and displaying a drawing pad with the user interface and/or to overlap the user interface upon receiving the first input; receiving a second input through the drawing pad; generating an image file based on the second input; changing the image file based on at least some of information on the application; and transmitting the changed image file through a wireless communication circuit to an external electronic device.

A method for operating an electronic device according to various example embodiments may include: receiving a first input; displaying a drawing pad in response to the first input; receiving a second input through the drawing pad; generating an image file based on the second input; receiving a third input of selecting the application to share the image file; changing the image file based on at least some of information on the application; and transmitting the changed image file through a wireless communication circuit to an external electronic device.

According to various example embodiments, there may be provided an electronic device and a method for operating the same which enable an image file, generated via a particular application running on a particular operating system, to be compatible with any operating system or any application.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
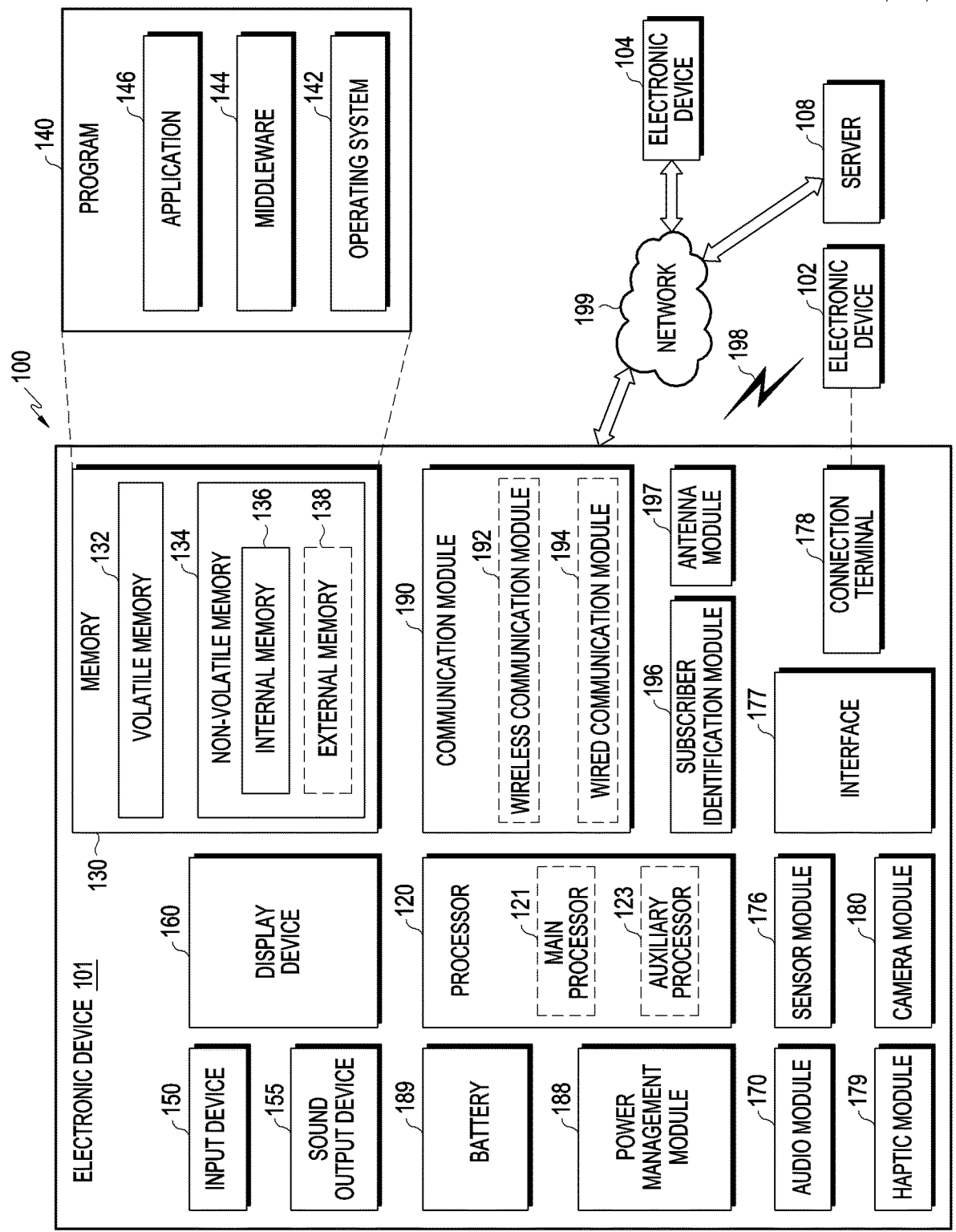
FIG. 1 is a block diagram illustrating a network environment including an electronic device according to various example embodiments.

FIG. 1 is a block diagram illustrating an electronic device 101 in a network environment 100 according to various example embodiments. Referring to FIG. 1, in the network environment 100, the electronic device 101 may communicate with an electronic device 102 via a first network 198 (e.g., via short-range wireless communication) or may communicate with an electronic device 104 and/or a server 108 via a second network 199 (e.g., via long-range wireless communication). According to an example embodiment, the electronic device 101 may communicate with the electronic device 104 via the server 108. According to an example embodiment, the electronic device 101 may include a processor (e.g., including processing circuitry) 120, a memory 130, an input device (e.g., including input circuitry) 150, a sound output device (e.g., including sound output circuitry) 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module 196, and an antenna module 197. In some example embodiments, at least one (e.g., the display device 160 or the camera module 180) of these components may be omitted, or another component may be further included in the electronic device 101. In some example embodiments, some components may be integrated as the sensor module 176 (e.g., a fingerprint sensor, an iris sensor, or an illumination sensor) embedded in the display device 160 (for example, a display).

The processor 120 may include various processing circuitry and run, for example, software (e.g., a program 140) to control at least one other component (e.g., a hardware or software component) of the electronic device 101 connected to the processor 120, and may perform various types of data processing and arithmetic operations. The processor 120 may load a command or data received from another component (e.g., the sensor module 176 or the communication module 190) into a volatile memory 132, may process the command or data, and may store the resulting data in a nonvolatile memory 134. According to one example embodiment, the processor 120 may include a main processor 121 (e.g., a central processing unit or an application processor) and may additionally or alternatively include a coprocessor 123 (e.g., a graphics processing unit, an image signal processor, a sensor hub processor, or a communications processor) that operates independently of the main processor 121, uses lower power than the main processor 121, or specializes in a designated function. Here, the coprocessor 123 may operate separately from the main processor 121 or may be embedded therein.

In this case, the coprocessor 123 may control at least some of the functions or states associated with at least one component (e.g., the display device 160, the sensor module 176, or the communication module 190) among the components of the electronic device 101, for example, instead of the main processor 121 when the main processor 121 is in an inactive (e.g., sleep) state, or along with the main processor 121 when the main processor 121 is in an active (e.g., application-running) state. According to an example embodiment, the coprocessor 123 (e.g., an image signal processor or a communications processor) may be configured as a part of another functionally related component (e.g., the camera module 180 or the communication module 190). The memory 130 may store various data, for example, software (e.g., the program 140), used by at least one component (e.g., the processor 120 or the sensor module 176) of the electronic device 101 and input data or output data about a command associated with the various data. The memory 130 may include a volatile memory 132 or a nonvolatile memory 134.

The program 140 may be software stored in the memory 130 and may include, for example, an operating system 142, middleware 144, and/or an application 146.

The input device 150 is an apparatus for receiving a command or data to be used for a component (e.g., the processor 120) of the electronic device 101 from the outside (e.g., a user) of the electronic device 101, and may include various input circuitry, such as, for example, and without limitation, a microphone, a mouse, and/or a keyboard, or the like.

The sound output device 155 is an apparatus for outputting a sound signal to the outside of the electronic device 101 and may include various sound output circuitry, such as, for example, and without limitation, a speaker for general use, such as for multimedia playback or recording playback, and/or a receiver for receiving telephone calls, or the like. According to an example embodiment, the receiver may be formed integrally with or separately from the speaker.

The display device 160 is an apparatus for visually presenting information to the user of the electronic device 101, and may include, for example, and without limitation, a display, a hologram device, and/or a projector, or the like, and a control circuit for controlling a corresponding device. According to an example embodiment, the display device 160 may include touch circuitry or a pressure sensor capable of measuring the strength of touch pressure.

The audio module 170 may bidirectionally convert a sound and an electrical signal. According to an example embodiment, the audio module 170 may acquire a sound through the input device 150 or may output a sound through an external electronic device (e.g., the electronic device 102 (e.g., a speaker and/or a headphone, or the like)) connected wirelessly or via a cable to the audio output device 155 or the electronic device 101.

The sensor module 176 may generate an electrical signal or a data value corresponding to an internal operating state (e.g., power or temperature) of the electronic device 101 or an external environmental condition. The sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support a designated protocol that enables wired or wireless connection to an external electronic device (e.g., the electronic device 102). According to one example embodiment, the interface 177 may include various interface circuitry, such as, for example, and without limitation, a High-Definition Multimedia Interface (HDMI), a Universal Serial Bus (USB) interface, an SD card interface, and/or an audio interface, or the like.

A connection terminal 178 may include a connector capable of physically connecting the electronic device 101 and an external electronic device (e.g., the electronic device 102), for example, as an HDMI connector, a USB connector, an SD card connector, or an audio connector (e.g., a headphone connector).

The haptic module 179 may convert an electrical signal into a mechanical stimulus (e.g., vibrations or a movement) or an electrical stimulus that is perceivable by the user through a tactile sensation or the sense of movement. The haptic module 179 may include various haptic circuitry, such as, for example, and without limitation, a motor, a piezoelectric element, and/or an electrical stimulation device, or the like.

The camera module 180 may capture a still image and a moving image. According to one example embodiment, the camera module 180 may include one or more lenses, an image sensor, an image signal processor, or a flash.

The power management module 188 is a module for managing power supplied to the electronic device 101 and may be configured, for example, as at least a part of a Power Management Integrated Circuit (PMIC).

The battery 189 is an apparatus for supplying power to at least one component of the electronic device 101 and may include, for example, a non-rechargeable primary battery, a rechargeable secondary battery, or a fuel cell.

The communication module 190 may include various communication circuitry and support establishing a wired or wireless communication channel between the electronic device 101 and an external electronic device (e.g., the electronic device 102, the electronic device 104, or the server 108) and performing communication through the established communication channel. The communication module 190 may include one or more communication processors that operate independently of the processor 120 (e.g., an application processor) and support wired communication or wireless communication. According to an example embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a power line communication module), and may communicate with an electronic device using a corresponding communication module thereamong via the first network 198 (e.g., a short-range communication network including a Bluetooth, Wi-Fi direct, or Infrared Data Association (IrDA) network) or the second network 199 (e.g., a long-range communication network including a cellular network, the Internet, or a computer network (e.g., a LAN or WAN)). The foregoing various types of communication modules 190 may be configured as a single chip or may be configured as separate chips.

According to an example embodiment, the wireless communication module 192 may identify and authenticate the electronic device 101 within a communication network using user information stored in the subscriber identity module 196.

The antenna module 197 may include one or more antennas for externally transmitting or receiving a signal or power. According to one example embodiment, the communication module 190 (e.g., the wireless communication module 192) may transmit a signal to or receive a signal from an external electronic device via an antenna suitable for a communication mode.

Some of the foregoing components may be connected to each other via a communication mode between peripheral devices (e.g., a bus, General Purpose Input/Output (GPIO), Serial Peripheral Interface (SPI), or Mobile Industry Processor Interface (MIPI) and may exchange signals (e.g., a command or data) with each other.

According to an example embodiment, a command or data may be transmitted or received between the electronic device 101 and the external electronic device 104 via the server 108 connected to the second network 199. Each of the electronic devices 102 and 104 may be a device of the same kind or a different kind from the electronic device 101. According to an example embodiment, all or some operations performed by the electronic device 101 may be performed by another external electronic device or a plurality of external electronic devices. According to an example embodiment, when the electronic device 101 needs to perform a function or a service automatically or upon request, the electronic device 101 may, instead of or in addition to autonomously executing the function or the service, request an external electronic device to perform at least some functions associated therewith. Upon receiving such a request, the external electronic device may execute the requested function or an additional function, and may transmit the result of execution thereof to the electronic device 101. The electronic device 101 may provide the requested function or service using the same received result or after additionally processing the result. To this end, for example, cloud-computing, distributed-computing, or client-server-computing technologies may be used.

Figure 2:
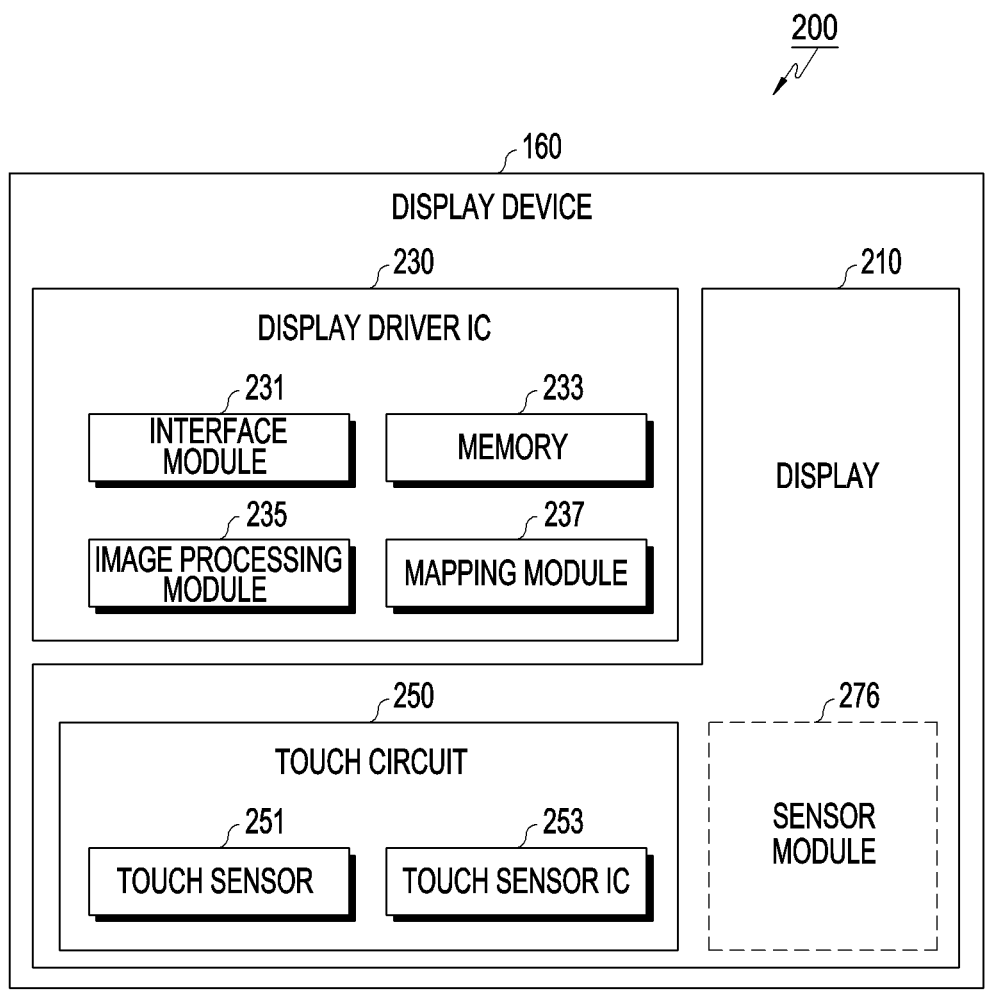
FIG. 2 is a block diagram illustrating an electronic device according to various example embodiments.

FIG. 2 is a block diagram 200 illustrating a display device 160 according to various example embodiments. Referring to FIG. 2, the display device 160 may include a display 210, and a Display Driver IC (DDI) 230 to control the display. The DDI 230 may include an interface module (e.g., including circuitry and/or program elements) 231, a memory 223 (e.g., a buffer memory), an image processing module (e.g., including processing circuitry and/or program elements) 235, and a mapping module (e.g., including circuitry and/or program elements) 237. The DDI 230 may receive, for example, through the interface module 231, image data from a processor 120 (e.g., a main processor 121 (e.g., an application processor) or a coprocessor 123 operating functionally independently of the main processor 121) or image information including an image control signal corresponding to a command to control the image data. The DDI 230 may communicate with a touch circuit 250 or a sensor module 176 through the interface module 231. In addition, the DDI 230 may store at least some of the received image information in the memory 233, for example, by frame. The image processing module 235 may perform preprocessing or post-processing (e.g., resolution, brightness, or size adjustment) of, for example, at least some of the image data at least based on characteristics of the image data or characteristics of the display 210. The mapping module 237 may convert the image data, preprocessed or post-processed by the image processing module 235, into a voltage value or a current value to drive pixels based on at least some of the attributes of the pixels of the display 210 (e.g., an array of the pixels (RGB stripe or PenTile) or the size of each subpixel). At least some pixels of the display 210 may be driven, for example, based on the voltage value or the current value so that visual information (e.g., text, an image, or an icon) corresponding to the image data may be displayed on the display 210.

According to an example embodiment, the display device 160 may further include the touch circuit 250. The touch circuit 250 may include a touch sensor 251 and a touch sensor IC 253 to control the touch sensor 251. The touch sensor IC 253 may control the touch sensor 251 to measure a change in a signal (e.g., voltage, light amount, resistance, or electric charge amount), for example, at a particular position of the display 210, thereby sensing a touch input or hovering input at the particular position and providing information on the sensed touch input or hovering input (e.g., position, area, pressure, or time) to the processor 120. According to an example embodiment, at least a portion of the touch circuit 250 (e.g., the touch sensor IC 253) may be provided as a part of the DDI 230 or the display 210 or as a part of another component (e.g., the coprocessor 123) disposed outside the display device 160.

According to an example embodiment, the display device 160 may further include at least one sensor (e.g., a fingerprint sensor, an iris sensor, a pressure sensor, or an illumination sensor) of a sensor module 276 or a control circuit for the sensor. In this case, the at least one sensor or the control circuit for the sensor may be embedded as a part of the display device 160 (e.g., the display 210 or the DDI 230) or a part of the touch circuit 250. For example, when the sensor module 276 embedded in the display device 160 includes a biosensor (e.g., a fingerprint sensor), the biosensor may obtain biometric information (e.g., a fingerprint image) associated with a touch input through a portion of the display 210. In another example, when the sensor module 276 embedded in the display device 160 includes a pressure sensor, the pressure sensor may obtain pressure information on a touch input through a portion or the entire area of the display 210. According to an example embodiment, the touch sensor 251 or the sensor module 276 may be disposed between pixels of a pixel layer of the display 210, or above or below the pixel layer.

An electronic device 101 according to various example embodiments may include: a housing (not shown); a touch-screen display (e.g., the display device 160 of FIG. 1 and FIG. 2) exposed through a portion of the housing, a wireless communication circuit (e.g., the communication module 190 of FIG. 1) disposed in the housing, a processor (e.g., the processor 120 of FIG. 1) electrically connected to the touchscreen display and the wireless communication circuit, and a memory 130 electrically connected to the processor 120 and configured to store an application including a user interface for transmitting a message through the wireless communication circuit 190, wherein the memory stores instructions that, when executed by the processor 120, cause the electronic device to: display the user interface of the application on the touchscreen display; display a virtual keyboard with the user interface and/or to overlap the user interface; receive a first input through the virtual keyboard; hide the virtual keyboard and display a drawing pad with the user interface and/or to overlap the user interface upon receiving the first input; receive a second input through the drawing pad; generate an image file based on the second input; change the image file based on at least some of information on the application; and transmit the changed image file through the wireless communication circuit.

According to an example embodiment, the image file may include a series of images generated based on the second user input. According to an example embodiment, the image file may be a GIF. According to an example embodiment, the processor 120 may change at least one of the size of the image file, a coding method, and metadata based on at least some of the information.

According to an example embodiment, the application may include at least one of a messaging application, an email application, and a social media service application.

According to an example embodiment, the processor 120 may sequentially generate n frames according to the second input received on the touchscreen display, may copy an object of an nth frame into a first frame, and may generate the image file using the n frames.

According to an example embodiment, the processor 120 may display, on the touchscreen display, the size of the image file generated based on the second user input and may determine whether the size of the image file reaches a threshold value.

According to an example embodiment, when the size of the image file is the threshold value or greater, the processor 120 may display information indicating that the size of the image file is the threshold value or greater on the touchscreen display.

According to an example embodiment, the processor 120 may activate a timer when the second user input is sensed, may terminate the timer when the second user input is not sensed, and may store the image file generated while the timer is activated.

According to an example embodiment, the processor 120 may set a first screen and a second screen including a first object generated corresponding to the second user input and an effect for the first object when the second user input is sensed, may display, on the first screen, a second object corresponding to the first object and the resumed second user input and an effect corresponding to the second object, may display, on the second screen, the first object, the effect corresponding to the first object, the second object, and the effect corresponding to the second object when sensing of the second user input is stopped and then resumed, and may generate the image file using the second screen.

According to an example embodiment, the information on the application may include at least one of a maximum size of an image file for the application to transmit, an operation implemented upon sharing the generated image file with another electronic device, and a quality of an effect provided for the generated image.

An electronic device 101 according to various example embodiments may include: a housing (not shown); a touchscreen display (e.g., the display device 160 of FIG. 1 and FIG. 2) exposed through a portion of the housing, a wireless communication circuit (e.g., the communication module 190 of FIG. 1) disposed in the housing, a processor 120 electrically connected to the touchscreen display 160 and the wireless communication circuit 190, and a memory electrically connected to the processor 120 and configured to store an application including a user interface for transmitting a message through the wireless communication circuit, wherein the memory stores instructions that, when executed by the processor 120, cause the electronic device to: receive a first input; display a drawing pad in response to the first input; receive a second input through the drawing pad; generate an image file based on the second input; receive a third input of selecting the application to share the image file; change the image file based on at least some of information on the application; and transmit the changed image file through the wireless communication circuit.

According to an example embodiment, the image file may include a series of images generated based on the second user input.

According to an example embodiment, the processor 120 may change at least one of the size of the image file, a coding method, and metadata based on at least some of the information.

According to an example embodiment, the application may include at least one of a messaging application, an email application, and a social media service application.

According to an example embodiment, the processor 120 may sequentially generate n frames according to the second user input received on the touchscreen display, may copy an object of an nth frame into a first frame, and may generate the image file using the n frames.

According to an example embodiment, the processor 120 may display the size of the image file generated based on the second user input and may determine whether the size of the image file is a threshold value or greater.

According to an example embodiment, the processor 120 may activate a timer when the second user input is sensed, may terminate the timer when the second user input is not sensed, and may store the image file generated while the timer is activated.

According to an example embodiment, the processor 120 may set a first screen and a second screen including a first object generated corresponding to the second user input and an effect for the first object when the second user input is sensed, may display, on the first screen, a second object corresponding to the first object and the resumed second user input and an effect corresponding to the second object, may display, on the second screen, the first object, the effect corresponding to the first object, the second object, and the effect corresponding to the second object when sensing of the second user input is stopped and then resumed, and may generate the image file using the second screen.

Figure 3:
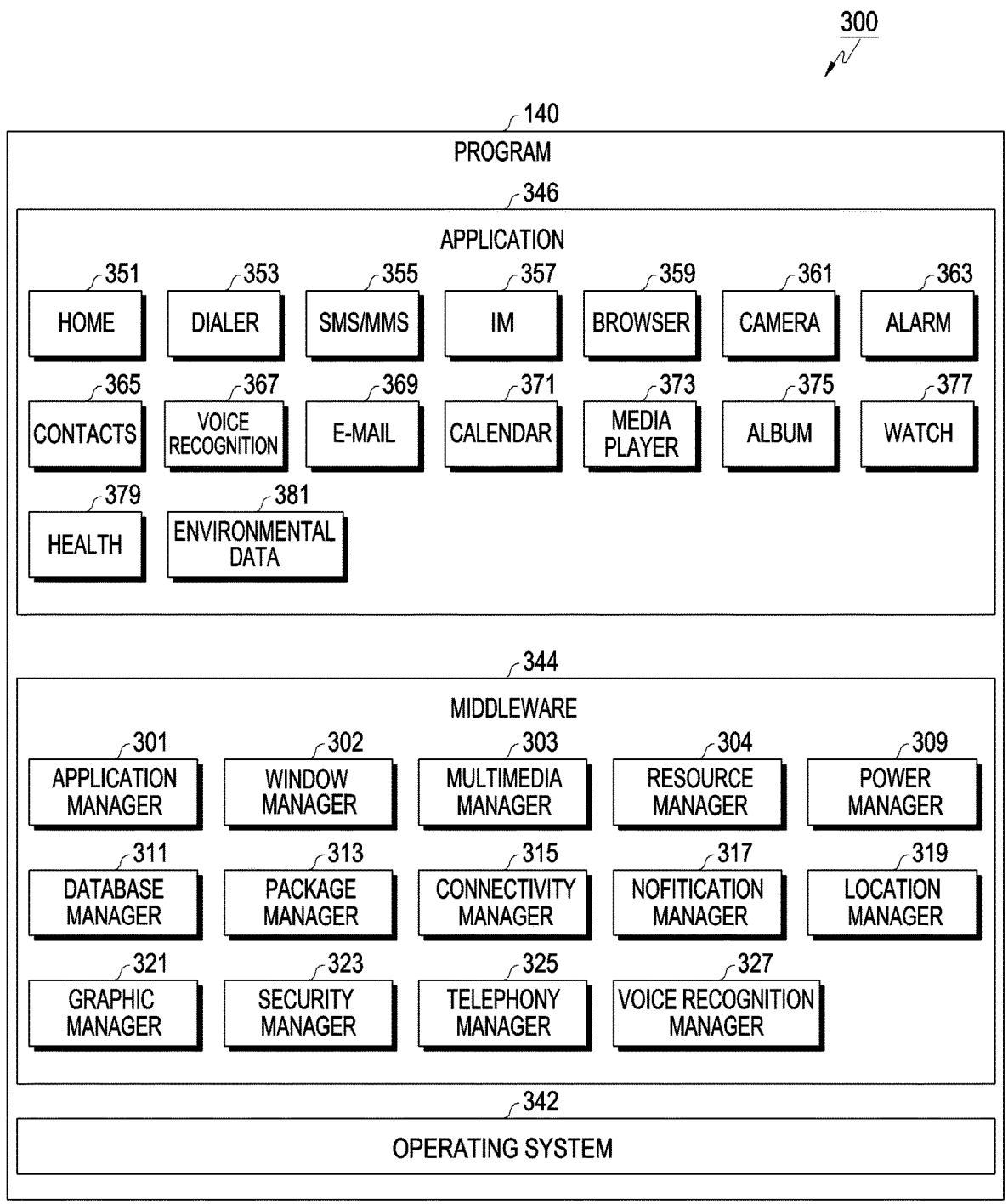
FIG. 3 is a block diagram illustrating a program module according to various example embodiments.

FIG. 3 is a block diagram 300 illustrating a program 140 according to various example embodiments. According to an example embodiment, the program 140 may include an operating system 342 to control one or more resources of an electronic device 101, a middleware 344, and/or an application 346 that runs on the operating system 342. The operating system 342 may be, for example, Android, iOS™, Windows, Symbian™, Tizen™, or Bada™. At least part of the program 140 may be preloaded onto the electronic device 101 at manufacture, or may be downloaded or updated from an external electronic device (e.g., an electronic device 102 or 104 or a server 108) in a user service environment.

The operating system 342 may control (e.g., allocate or recover) system resources (e.g., a process, a memory, or power) of the electronic device 101. The operating system 342 may, additionally or alternatively, include one or more driver programs to drive other hardware devices of the electronic device 101, for example, an input device 150, a sound output device 155, a display device 160, an audio module 170, a sensor module 176, an interface 177, a haptic module 179, a camera module 180, a power management module 188, a battery 189, a communication module 190, a subscriber identity module 196, or an antenna module 197.

The middleware 344 may provide various functions to the application 346 so that the application 346 may use a function or information provided by one or more resources of the electronic device 101. The middleware 344 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327. The application manger 301 may manage, for example, the life cycle of the application 346. The window manager 303 may manage, for example, GUI resources used for a screen. The multimedia manager 305 may identify formats necessary to play various media files, and may encode or decode a media file using a codec suitable for a corresponding format. The resource manager 307 may manage, for example, a source code or a memory space of the application 346. The power manager 309 may manage, for example, the capacity, temperature or power of a battery and may provide information on power necessary for the operation of the electronic device 101 using corresponding information thereamong. According to one example embodiment, the power manager 309 may interoperate with a Basic Input/Output System (BIOS).

The database manager 311 may generate, retrieve, or change, for example, a database to be used for the application 346. The package manager 313 may install or update, for example, an application distributed in the form of a package file.

The connectivity manager 315 may manage, for example, wireless or wired connectivity between the electronic device 101 and an external electronic device. The notification manager 317 may provide, for example, a function of reporting the occurrence of an event (e.g., a call, a message, or an alarm) to a user. The location manager 319 may manage, for example, position information on the electronic device 101. The graphic manager 321 may manage, for example, a graphic effect to be provided for a user or a user interface related to the graphic effect.

The security manager 323 may provide, for example, system security or user authentication. The telephony manager 325 may manage, for example, a voice or video call function of the electronic device 101. The voice recognition manager 327 may transmit, for example, voice data on a user, to a server 108 and may receive a command corresponding to a function to be performed in the electronic device 101 based on the voice data or text data converted based on the voice data. According to an example embodiment, the middleware 344 may dynamically delete some of the existing components or may add new components. According to an example embodiment, at least part of the middleware 344 may be included as a part of the operating system 342 or may be configured as software separate from the operating system 342.

The application 346 may include, for example, home screen 351, dialer 353, SMS/MMS 355, Instant Messaging (IM) 357, browser 359, camera 361, an alarm 363, address book (contacts) 365, voice recognition 367, email 369, calendar 371, media player 373, album 375, clock (watch) 377, and/or health care 379 (e.g., for measuring exercising or blood sugar), and/or environmental data 381 (e.g., atmospheric pressure, humidity, or temperature data) applications. According to one example embodiment, the application 346 may further include an information exchange application (not shown) that supports information exchange between the electronic device 101 and an external electronic device. The information exchange application may include, for example, a notification relay application for relaying specific information (e.g., a call, a message, or an alarm) to an external electronic device or a device management application for managing an external electronic device. For example, the notification relay application may transmit, to an external electronic device, notification information corresponding to an event (e.g., receipt of mail) occurring in another application (e.g., the email application 369) of the electronic device 101 or may receive notification information from an external electronic device and may provide the notification information to the user of the electronic device 101. The device management application may control, for example, power (e.g., turning on or turning off) or a function (e.g., the brightness, resolution, or focus of the display device 160 or the camera module 180) of an external electronic device communicating with the electronic device 101 or some components of the electronic device 101 (e.g., the display device 160 or the camera module 180). Additionally or alternatively, the device management application may support the installation, deletion, or update of an application operating in an external electronic device.

Figure 4:
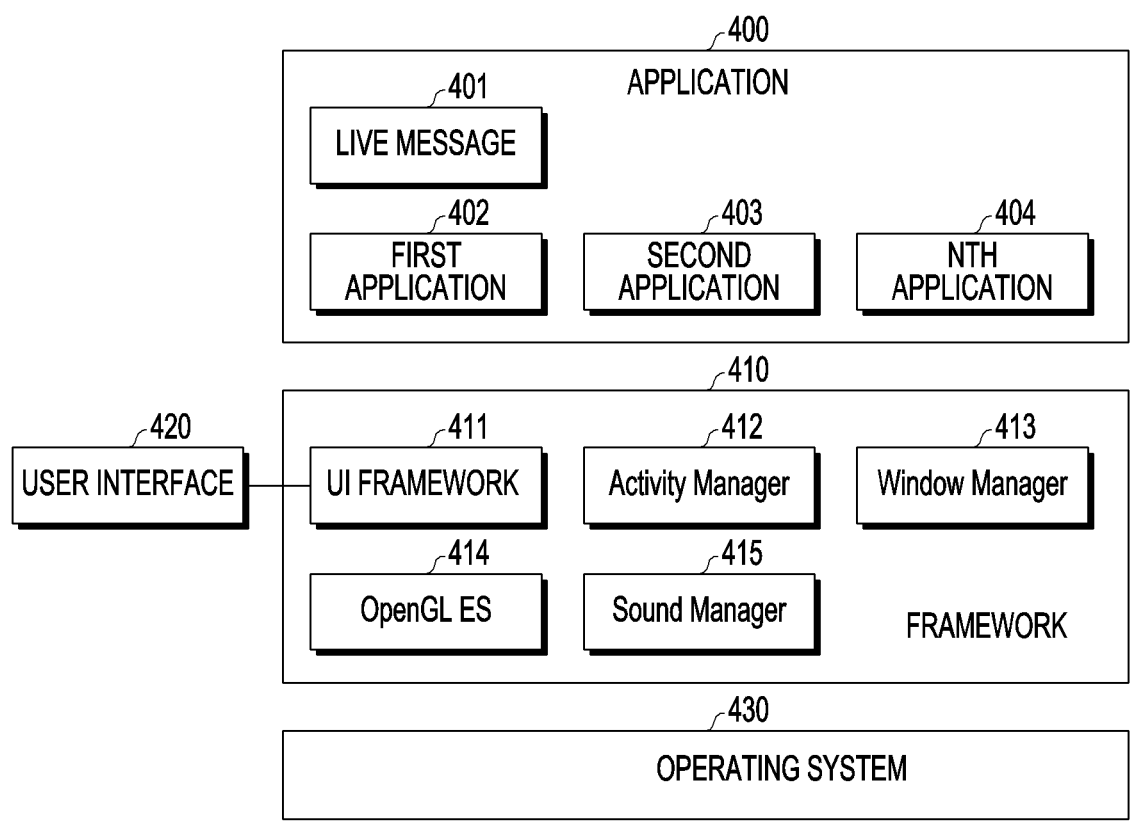
FIG. 4 is a block diagram illustrating a program module according to various example embodiments.

FIG. 4 is a block diagram illustrating a program module according to various example embodiments.

According to an example embodiment, an electronic device (e.g., the electronic device 101 of FIG. 1) according to various example embodiments may include at least one application 400 running on the electronic device (e.g., the electronic device 101 of FIG. 1). The at least one application 400 may be included in a program 140 of the electronic device (e.g., the electronic device 101 of FIG. 1). The at least one application 400 may include a live message application (e.g., including program elements) 401, a first application (e.g., including program elements) 402, a second application (e.g., including program elements) 403, and an nth application (e.g., including program elements) 404. The live message application 401 may refer, for example, to an application capable of generating a dynamic image file (e.g., a live message) by user input and may include any other applications having a function of generating a dynamic image file, without being limited to the application designated by such a term. A dynamic image file may have a series of images, which may be used to provide a user with a moving image instead of a still image. A dynamic image file may have a format of GIF, AGIF, JPG; MOV, or the like. The first application 402, the second application 403, and the nth application 404 may include home screen 351, dialer 353, SMS/MMS 355, Instant Messaging (IM) 357, browser 359, camera 361, an alarm 363, address book 365, voice recognition 367, email 369, calendar 371, media player 373, album 375, clock 377, and/or health care 379 (e.g., for measuring exercising or blood sugar), and/or environmental data 381 (e.g., atmospheric pressure, humidity, or temperature data) applications. The first application 402 to the nth application 404 are provided for illustrative purposes only, and the number or type of applications included in the at least one application 400 is not limited by the details illustrated in FIG. 4.

The electronic device (e.g., the electronic device 101 of FIG. 1) may include an operating system 430 (e.g., the operating system 142 of FIG. 1) to control one or more resources of electronic device 101. The electronic device (e.g., the electronic device 101 of FIG. 1) may include a framework module 410 to drive the electronic device 101. The framework module 410 may include a User Interface (UI) framework 411, an activity manager 412, a window manager 413, an OpenGL ES 414, and/or a sound manager 415. The UI framework 411 may collectively refer to a module that receives information through a UI 420, displays the information on a touchscreen display, and receives user input. The activity manager 412 may collectively refer to a module that performs an operation, such as generating, starting, resuming, or stopping an activity as an application object. The OpenGL ES 414 may collectively refer to a module that provides a graphic API set supporting GPU acceleration in order to achieve more brilliant graphic effects than those provided by the UI framework. The sound manager 415 may collectively refer to a module that assigns a sound resource to the operation of an activity based on the operation of the activity and controls the assigned sound resource.

Figure 5:
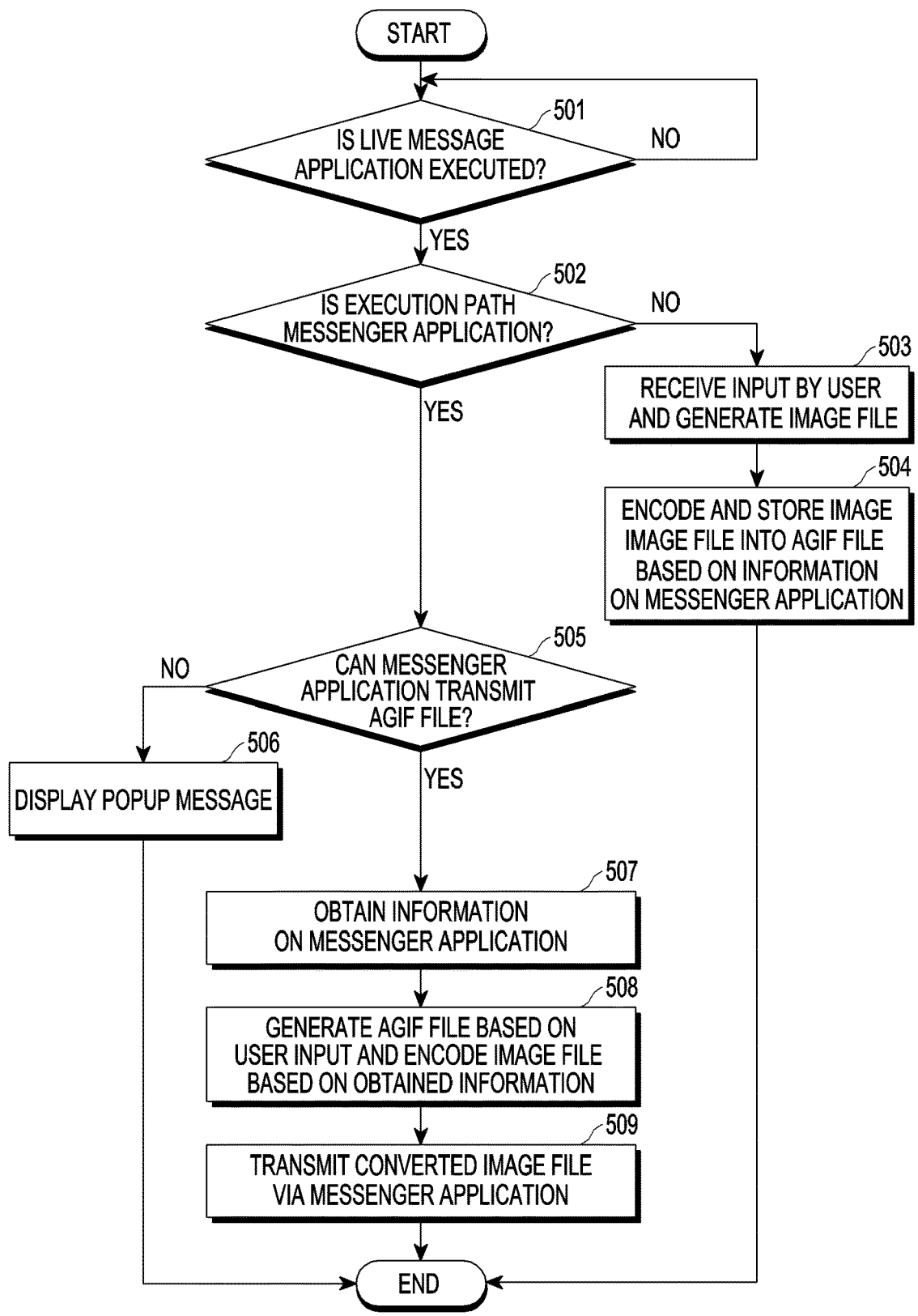
FIG. 5 is a flowchart illustrating a method for an electronic device to generate and transmit a live message according to various example embodiments.

FIG. 5 is a flowchart illustrating a method for an electronic device to generate and transmit a live message according to various example embodiments.

In operation 501, a processor (e.g., the processor 120 of FIG. 1) may determine whether a live message application is executed in an electronic device (e.g., the electronic device 101 of FIG. 1). When it is determined that the live message application is not executed, the processor may periodically or aperiodically determine whether the live message application is executed. For example, the processor may determine whether the live message application is executed based on at least some of various types of trigger detection for the execution of the live message application.

In operation 502, the processor may determine whether an execution path of the live message application is a messenger application. The messenger application may be an application that enables the electronic device 101 to transmit a message to another electronic device or to receive a message from another electronic device. For example, the messenger application may include a messaging application, an email application, a social media service application (e.g., Allo, Line, Kakao Talk, Viber, or Facebook Messenger), or the like.

Figure 9A:
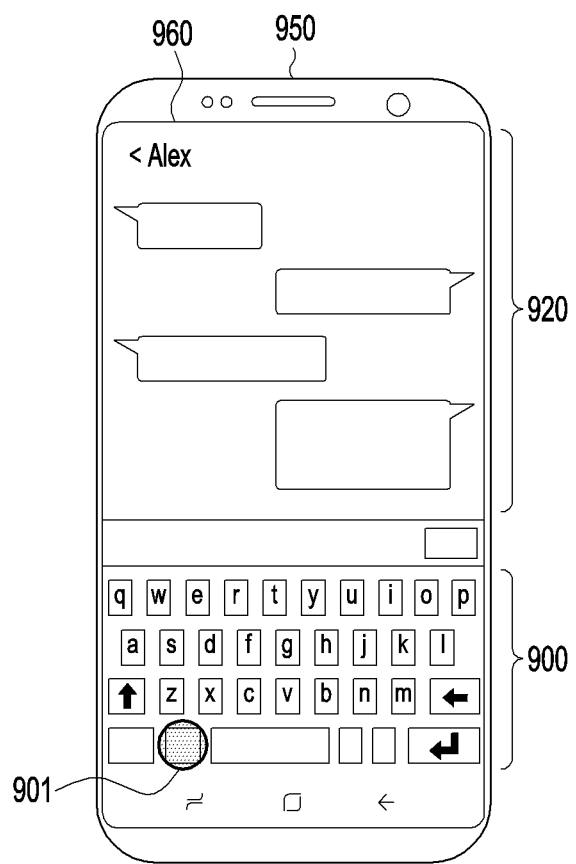
FIGS. 9A, 9B, 9C, 9D, 9E, 9F and 9G are diagrams illustrating a configuration for an electronic device to provide a live message creation interface according to various example embodiments.

Referring to FIG. 9A, with an execution screen of the messenger application displayed on a touchscreen display 960 (the display device 160 of FIGS. 1 and 2) of the electronic device 950 (e.g., the electronic device 101 of FIG. 1), a virtual keyboard 900 may be provided. The virtual keyboard 900 may include a live message application execution button 901. Upon receiving a touch input via the live message application execution button 901 from a user, the processor may execute the live message application. When the live message application is executed through the live message application execution button 901 included in the virtual keyboard 900, the processor may determine that the execution path of the live message application is the messenger application.

Figure 9B:
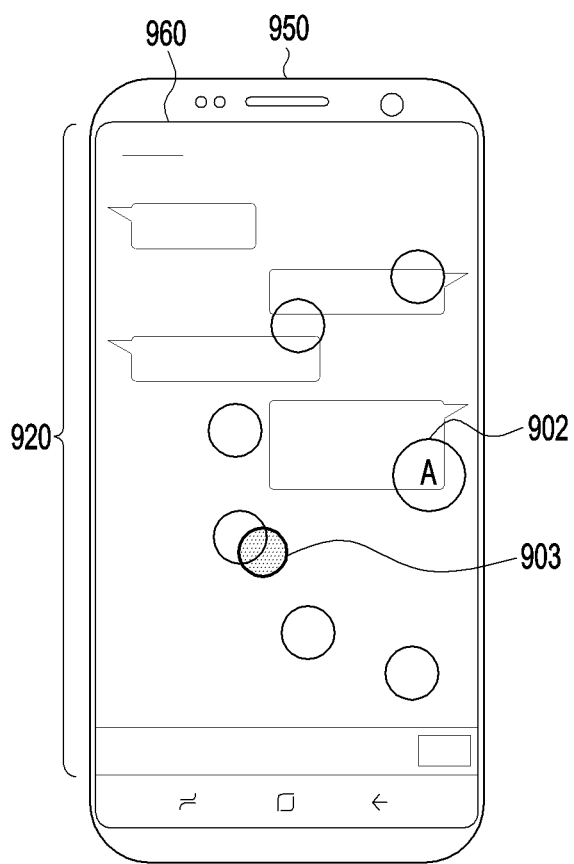

According to an example embodiment, referring to FIG. 9B, the electronic device may execute the live message application through the input of an air command sensed on the touchscreen display. The air command refers to a command via an input with an external input device sensed on the display of the electronic device, in which the external input device may include a stylus pen. In FIG. 9B, when receiving an air command input for a particular icon 902 displayed on the touchscreen display with the messenger application executed and then receiving an input to an interface 903 to execute the live message application displayed accordingly, the processor may execute the live message application. When the live message application is executed through the air command input with the messenger application executed, the processor may determine that the execution path of the live message application is the messenger application.

In operation 505, the processor may determine whether the messenger application can transmit an AGIF file. An Animated Graphics Interchange Format (AGIF) may be a technique or image format for generating and playing a video by generating a plurality of graphics interchange format images. For example, the processor may determine whether the messenger application supports an AGIF file. When the messenger application cannot transmit an AGIF file, the processor may display, on the touchscreen display, a popup window (hereinafter, "popup") indicating information that the messenger application cannot transmit an AGIF file in operation 506.

In operation 507, the processor may obtain information on the messenger application. In operation 508, the processor may generate an AGIF file based on a user input and may encode the AGIF file based on the obtained information. The information on the messenger application may include information necessary for the messenger application to transmit a live message, such as the maximum capacity of a file that the messenger application can transfer, an operation in sharing a file with another electronic device, and the quality of an effect corresponding to an object. Table 1 below shows illustrative information on various messenger applications (first, second, third, and fourth applications).

TABLE 1

| Application | Operation in sharing | Coding method (25 MB size) | Coding method (8 MB size) | Effect quality |
|---|---|---|---|---|
| First application | X | Resize to 518 KB | Resize to 554 KB | Low |
| Second application | Share popup, Select chat room after selecting first application | Error popup | Error popup (2 MB possible) | Same as object |

TABLE 1-continued

| Application | Operation in sharing | Coding method (25 MB size) | Coding method (8 MB size) | Effect quality |
|---|---|---|---|---|
| Third application | Friends list, Chat window selection screen | Limit to 15 MB, error popup | Possible | Same as object |
| Fourth application | Share popup, Chat window selection screen | Limit to GIF 20 MB, Error popup | Possible | None |

For example, when transmitting an image file of 25 megabytes (MB) generated using the live message application through a first application, the processor may convert the image file into a file of 518 kilobytes (KB) based on information on the first application (e.g., a coding method (25 MB size)) and may transmit the image file to the an external electronic device. The processor may convert or change the image file generated via the live message application based on at least some of the information on the messenger application. Various numerical values, such as 25 MB, 8 MB, and 518 KB, and various types of popups listed in Table 1 are provided only for illustrative purposes, and it would be readily understood by those skilled in the art that various changes and modifications can be adopted.

In operation 509, the processor may transmit the converted image file to another electronic device via the messenger application. The processor may transmit the converted image file to another electronic device using the messenger application via a wireless communication circuit included in the electronic device.

Figure 9C:
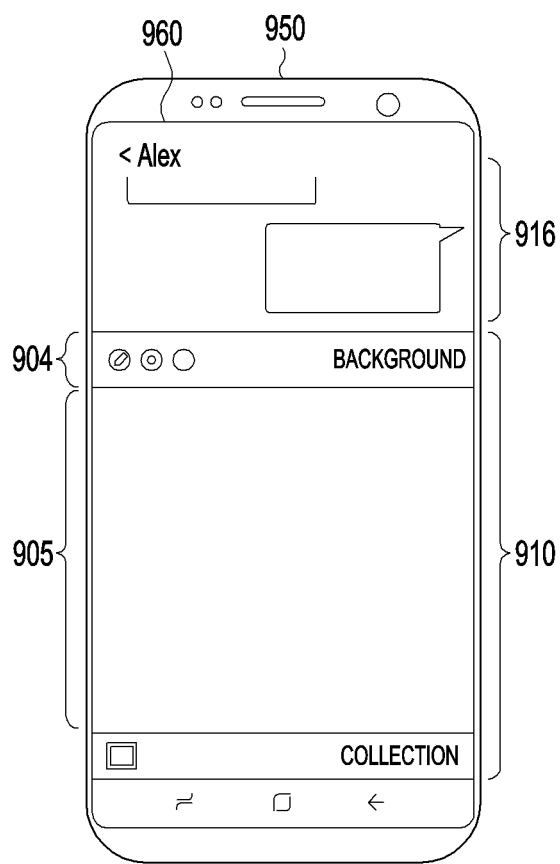
Figure 9D:
Figure 9E:
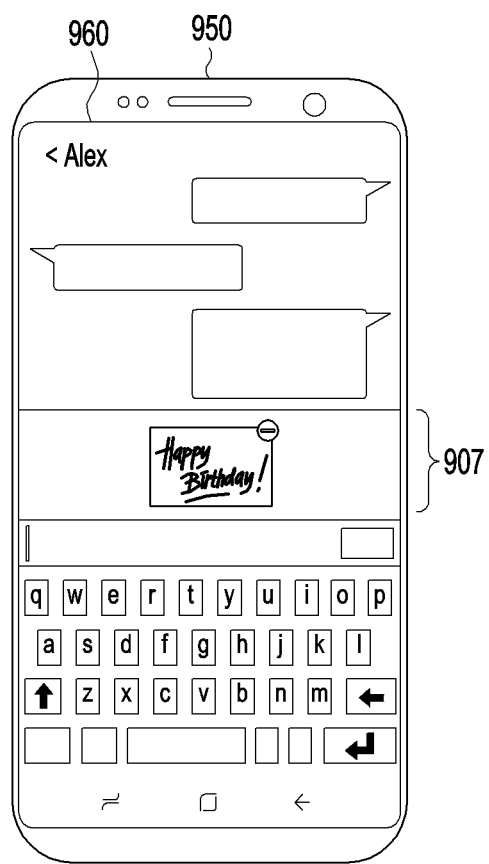
Figure 9F:
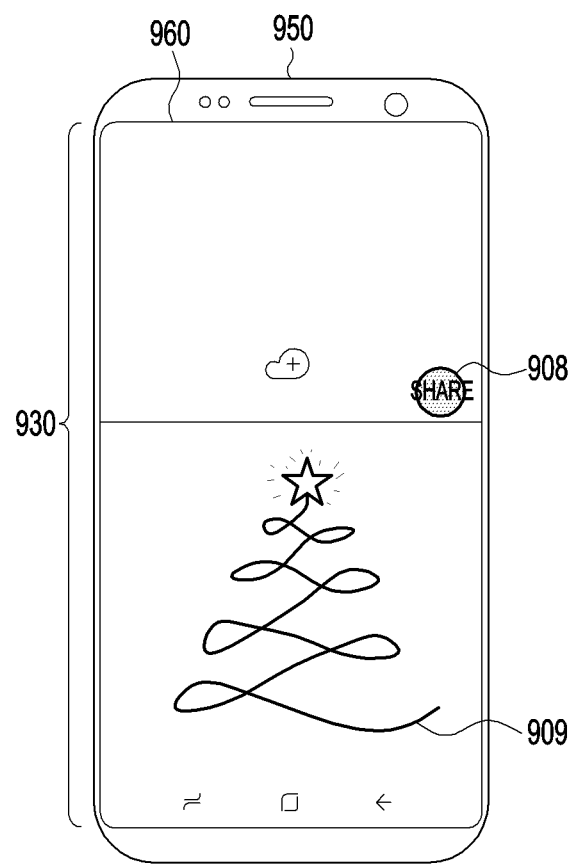

According to an example embodiment, when it is determined that the execution path of the live message application is not the messenger application, the processor may receive an input via the executed live message application to generate an image file in operation 503 and may encode the generated image file. For example, when a user directly executes the live message application, not via the messenger application, the processor may receive an input to generate an object 909 (e.g., see FIG. 9F) via the touchscreen display and may generate an image file, as illustrated in FIG. 9F. The image file may include the object based on the user input.

In operation 504, when the generated image file is an AGIF file, the processor may store the image file by at least one scheme according to the settings. Each of the at least one scheme corresponds to at least one application, and the processor may store and encode the image file into an appropriate size or capacity so that the image file can be transmitted through each application.

Figure 6:
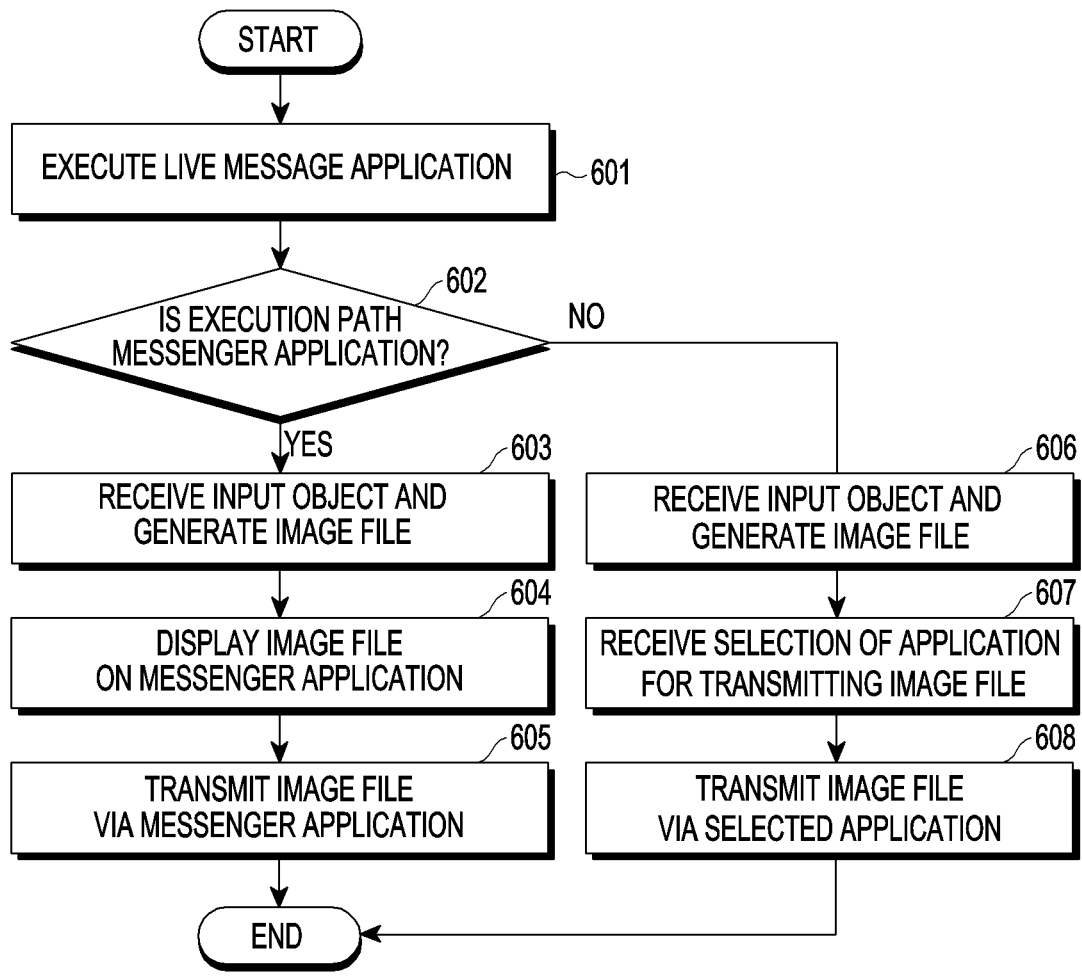
FIG. 6 is a flowchart illustrating a method for an electronic device to start creating a live message according to various example embodiments.

FIG. 6 is a flowchart illustrating a method for an electronic device to start creating a live message according to various example embodiments.

In operation 601, a processor (e.g., the processor 120 of FIG. 1) may execute a live message application. In operation 602, the processor may determine whether an execution path of the live message application is a messenger application. For example, the processor may execute the live message application through various methods of FIGS. 9A, 9B and 9F. For example, the processor may execute the live message application via the messenger application as in FIG. 9A or 9B, or may execute the live message application not via the messenger application as in FIG. 9E. The processor may determine whether the execution path of the live message application is the messenger application.

When it is determined that the execution path of the live message application is the messenger application, the processor may receive object input by a user and may generate an image file in operation 603. Referring to FIG. 9C, when the live message application is executed through the messenger application in FIG. 9A or 9B, the processor may display a drawing pad 910 for the user to input an object along with a user interface 916 of the messenger application and/or to overlap the user interface 916 of the messenger application. The drawing pad 910 may include a toolbar 904 that provides various additional functions when a user inputs an object and an input window 905 for receiving input of an object from the user. The toolbar 904 and the input window 905 in FIG. 9C are provided illustrative purposes, and the drawing pad 910 described herein is not limited by FIG. 9C. Referring to FIG. 9D, the processor may detect input of an object 906 by the user on the input window 905 included in the drawing pad 910 via the touchscreen display 960 and may generate an image corresponding to the object. The processor may combine a series of images generated corresponding to the user's input to generate an image file.

In operation 604, the processor may display the image file on an execution screen of the messenger application. As illustrated in FIG. 9D, when the user completes the input of the object 906 and wishes to transmit the image file generated according to the input, the processor may receive an input via a DONE button 970. When the input via the DONE button 970 is received, the processor may display an image file 907 on the messenger application as illustrated in FIG. 9E. The processor may provide a preview of the image file 907 by displaying the image file 907 on the messenger application.

In operation 605, the processor may transmit a live message image file via the messenger application. When the processor receives an input to transmit an image file via a touchscreen, the processor may transmit the image file to an external electronic device via the messenger application using a wireless communication circuit.

According to an example embodiment, when it is determined that the execution path of the live message application is not the messenger application at operation 602, the processor may receive input of an object via the live message application and may generate an image file based on the input in operation 606.

Figure 9G:
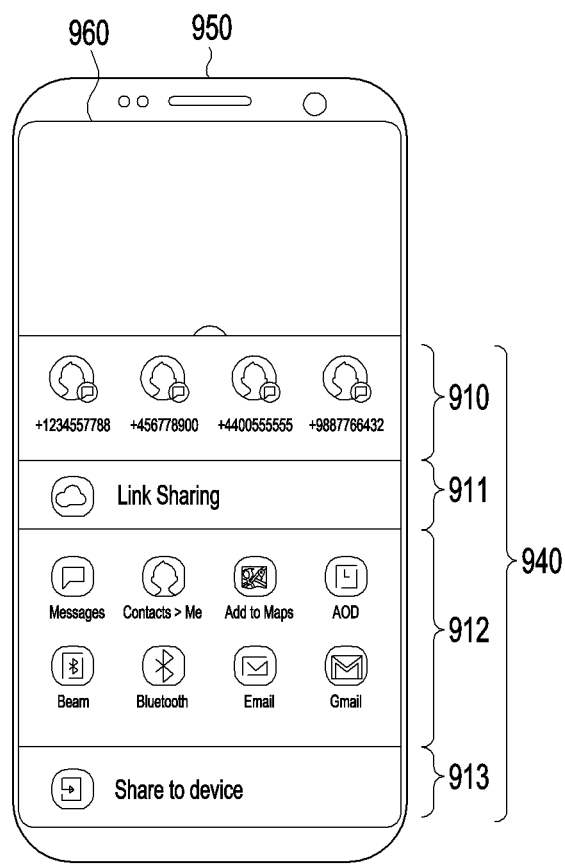

In operation 607, the processor may receive a selection of an application for transmitting the image file. Referring to FIG. 9F, when the user completes inputting an object 909, the processor may receive an input via a button 908 to select an application for sharing the image file. When the input via the button 908 is sensed, the processor may generate an image file including the object and may display an execution screen of an application 940 for sharing the image file as illustrated in FIG. 9G. For example, referring to FIG. 9G, the processor may display, on the display, contact information 910 on a particular person (e.g., a recently contacted person), a cloud application icon 911, various other application icons 912, and an icon 913 for sharing with another electronic device.

In operation 608, the processor may transmit the image file via the selected application. When receiving a selection of an application for transmitting the image file in operation 607, the processor may transmit the image file to an external electronic device via the selected application using the wireless communication circuit.

Figure 7:
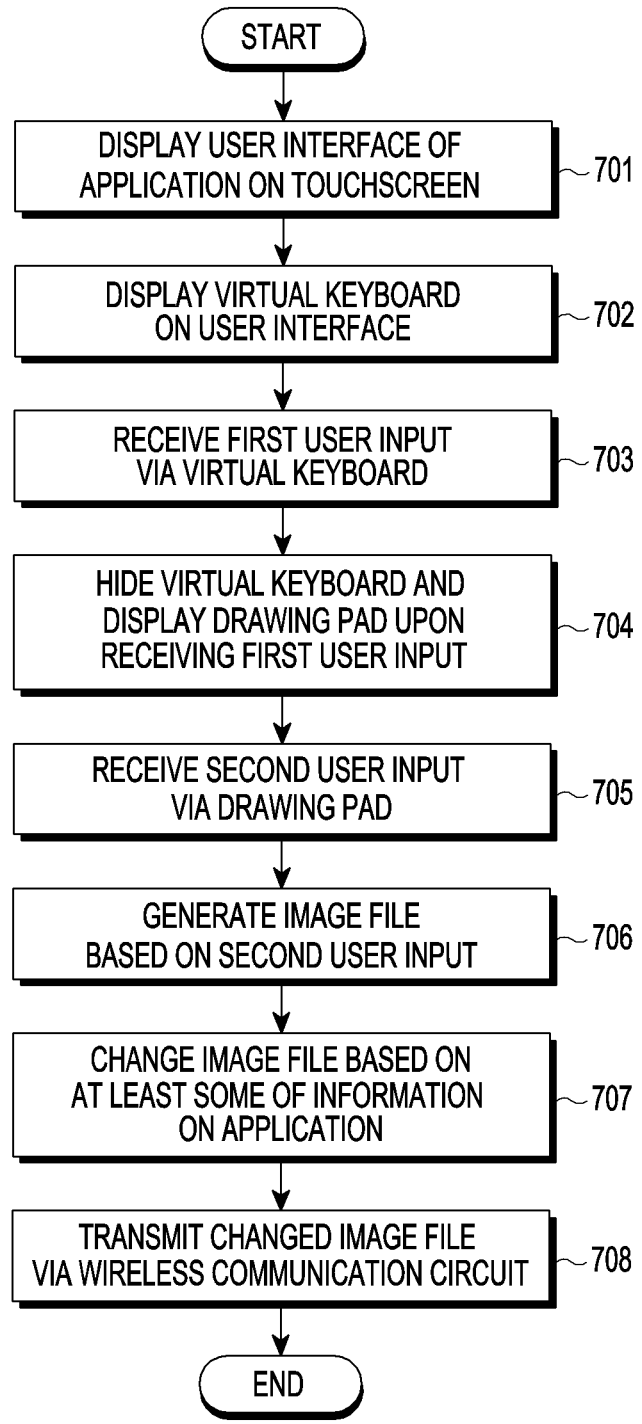
FIG. 7 is a flowchart illustrating a method for an electronic device to provide an interface for creating a live message according to various example embodiments.

FIG. 7 is a flowchart illustrating a method for an electronic device to provide an interface for creating a live message according to various example embodiments.

In operation 701, a processor (e.g., the processor 120 of FIG. 1) may display a user interface of an application on a touchscreen display (e.g., the display device 160 of FIGS. 1 and 2). Referring to FIGS. 9A and 9B, the processor may display a user interface 920 of an application on a touchscreen display 960. The application may be a messenger application as described above.

In operation 702, the processor may display a virtual keyboard on the user interface. For example, referring to FIG. 9A, the processor may display a virtual keyboard 900. The processor may display the virtual keyboard 900 along with the user interface 920 of the application or may display the virtual keyboard 900 to overlap the user interface 920 of the application.

In operation 703, the processor may receive a first user input via the virtual keyboard. When the first user input is received, the processor may hide the virtual keyboard and may display a drawing pad in operation 704. For example, referring to FIG. 9A, the processor may receive a first user input via a live message application execution button 901 included in the virtual keyboard 900. The first user input may be performed by a user and may be sensed through the touchscreen display. When the first user input via the live message application execution button 901 is received in FIG. 9A, the processor may hide the virtual keyboard 900 and may display a drawing pad 910 with the user interface or to overlap the same as illustrated in FIG. 9C.

In operation 705, the processor may receive a second user input via the drawing pad. Referring to FIGS. 9C and 9D, the processor may receive a second user input to generate an object 906 via the drawing pad 910. The processor may receive the second user input via the touchscreen display 960.

In operation 706, the processor may generate an image file based on the second user input. Referring to FIG. 9D, the processor may generate a series of image frames by recording the object 906 generated based on the second user input and may generate an image file using the generated image frames.

In operation 707, the processor may change the image file based on at least some of information on the application. The processor may change the image file based on at least some of the information on the application described in Table 1. For example, the processor may resize capacity or may change a file format so that the image file can be changed by the currently running application. Specifically, the processor may change the image file into an AGIF or a GIF. For example, the processor may change at least one of the size of the image file, a coding method, and metadata on the image file based on at least some of the information on the application.

In operation 708, the processor may transmit the changed image file via a wireless communication circuit. For example, the processor may transmit the image file using the wireless communication circuit through the currently running messenger application.

Figure 8:
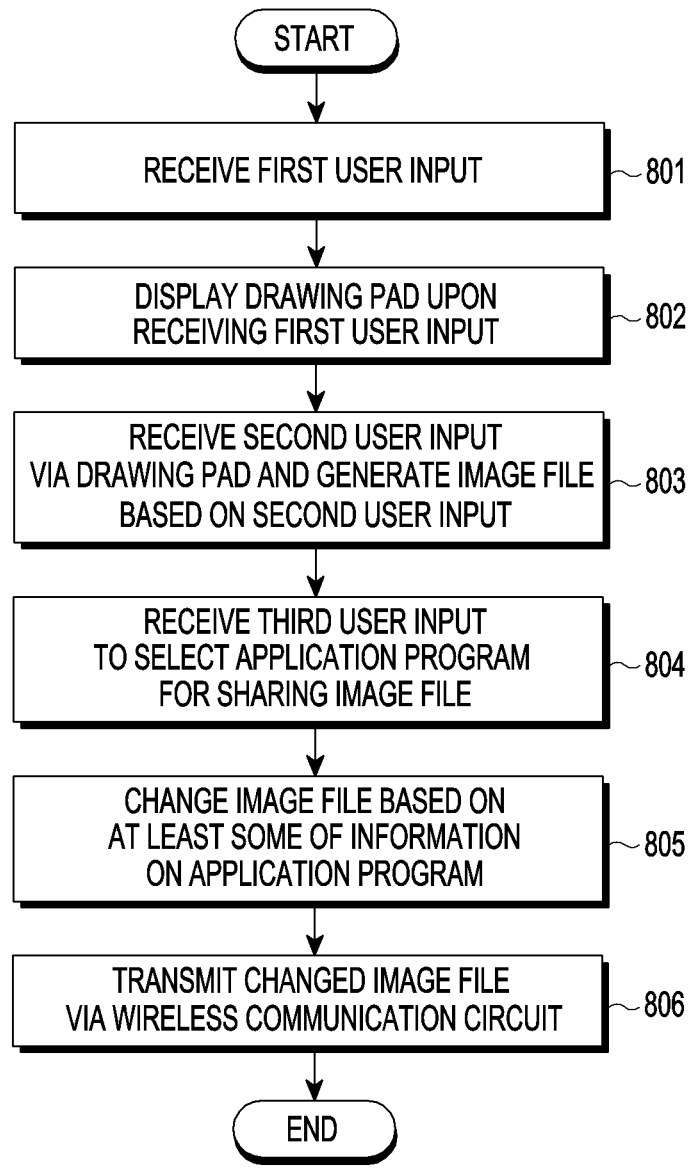
FIG. 8 is a flowchart illustrating a method for an electronic device to provide a live message creation interface when receiving an input from an external input device according to various example embodiments.

FIG. 8 is a flowchart illustrating a method for an electronic device to provide a live message creation interface when receiving an input from an external input device according to various example embodiments.

In operation 801, a processor (e.g., the processor 120 of FIG. 1) may receive a first user input. Referring to FIG. 9B, the processor may receive a first user input sensed through a sensor. For example, the first user input may be an air command to execute a live message application, which is described above. The processor may sense the first user input as an air command input and may execute the live message application, with a messenger application executed as in FIG. 9B or with the messenger application not executed as in FIG. 9F.

In operation 802, the processor may display a drawing pad upon receiving the first user input. Referring to FIG. 9C, when the first user input is sensed with the messenger application executed, the processor may display a drawing pad 910 along with a user interface 916 of the messenger application or to overlap the user interface. Referring to FIG. 9F, when the first user input is sensed with the messenger application not executed, the processor may display a drawing pad 930 on the entire display.

In operation 803, the processor may receive a second user input via the drawing pad and may generate an image file based on the second user input. Referring to FIG. 9D or 9F, the processor may sense a second user input that is input on the drawing pad 910 or 930. The second user input may be an input to create an object 906 or 909. The processor may generate a series of images by time according to the second user input to create the object and may combine the generated images to generate an image file.

In operation 804, the processor may receive a third user input to select an application program for sharing the image file. Referring to FIGS. 9F and 9G, when a user completes the second user input for the object 909 and the processor receives an input via a SHARE button 908, the processor may display an application 940 for sharing the image file for selection. The application for sharing the image file has been described in detail in operation 607 of FIG. 6 and thus will not be described here.

In operation 805, the processor may change the image file based on at least some of information on the application program. According to an example embodiment, information on an application selected by the third user input may be stored in a memory. The processor may change the stored image file based on the information on the application stored in the memory. The information on the application may be information included in Table 1. The processor may change or convert the image file based on, for example, image file transmission methods different for each application and sizes. For example, when the application selected for sharing is a first application and the image file has a size of 25 MB or more, the processor may resize the image file to 518 KB.

In operation 806, the processor may transmit the changed image file via a wireless communication circuit. For example, the processor may transmit the changed or converted image file to an external electronic device through the wireless communication circuit.

Figure 10:
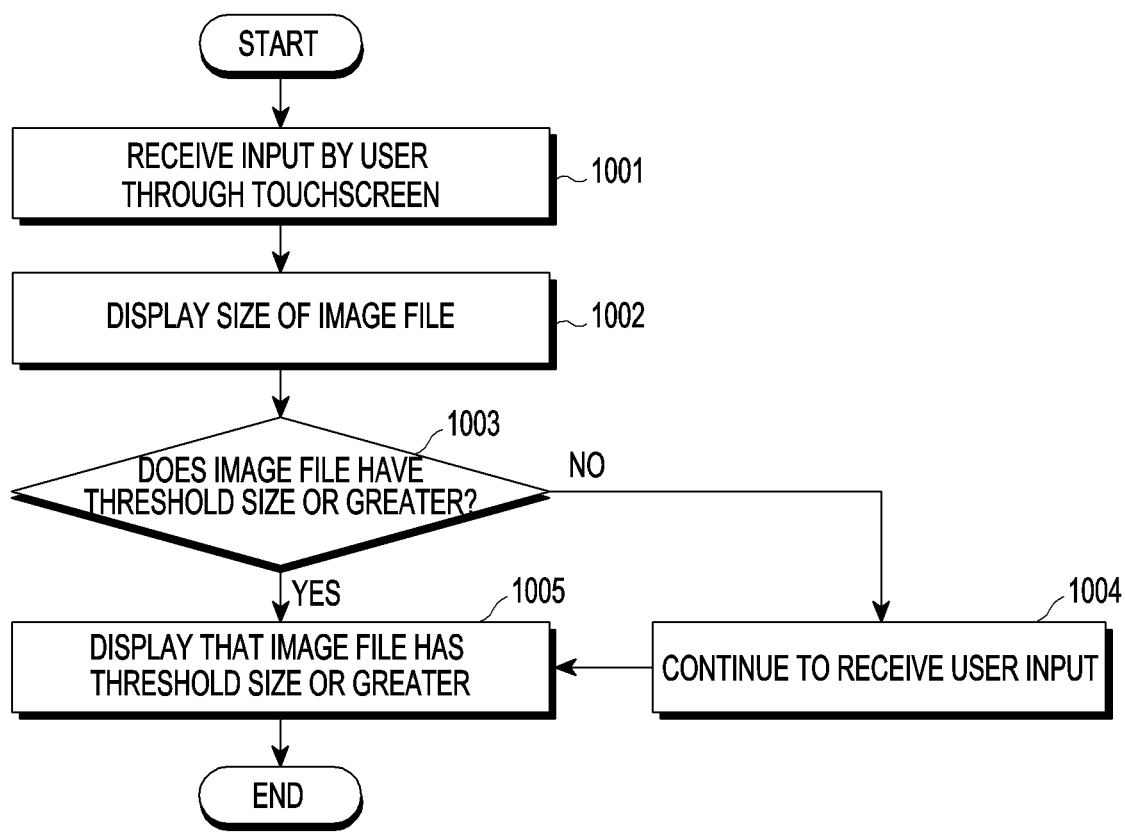
FIG. 10 is a flowchart illustrating a method for an electronic device to display the size of a generated live message according to various example embodiments.

FIG. 10 is a flowchart illustrating a method for an electronic device to display the size of a generated live message according to various example embodiments. FIGS. 11A, 11B, 11C and 11D are diagrams illustrating examples of a graphic user interface an electronic device to display the size of a live message according to various example embodiments.

In operation 1001, a processor (e.g., the processor 120 of FIG. 1) may receive an input by a user through a touchscreen display 1150 (e.g., the display device 160 of FIG. 1). The input sensed through the touchscreen display 1150 of an electronic device 1100 (e.g., the electronic device 101 of FIG. 1) may be an input to generate an image file including an object.

Figure 11A:
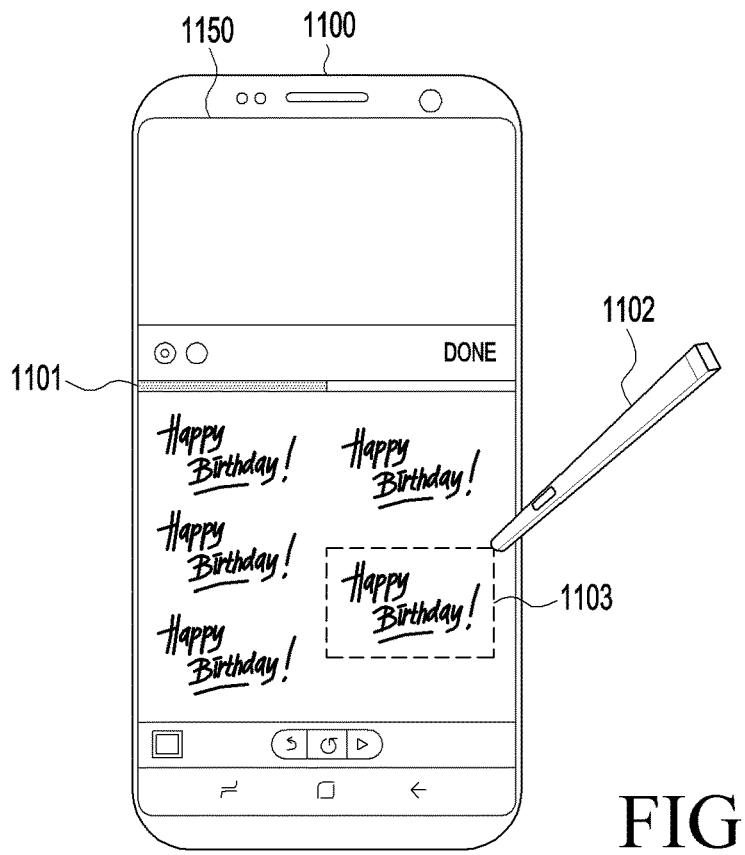
FIGS. 11A, 11B, 11C and 11D are diagrams illustrating a configuration for an electronic device to display the size of a live message according to various example embodiments.

In operation 1002, the processor (e.g., the processor 120 of FIG. 1) may display the size of a generated image file. Referring to FIG. 11A, the processor may display the size of the image file in various ways. For example, the processor may display the size of an image file currently being created in the form of a bar 1101. For example, when an input by the user to display an object 1103 is received through a pen input tool 1102, the estimated size of a generated image file and the maximum size of the image file may be displayed based on information input so far. However, the input by the user is not necessarily performed by the pen input tool 1102, and an input on the touchscreen display 1150 may be sensed in various ways.

Figure 11B:
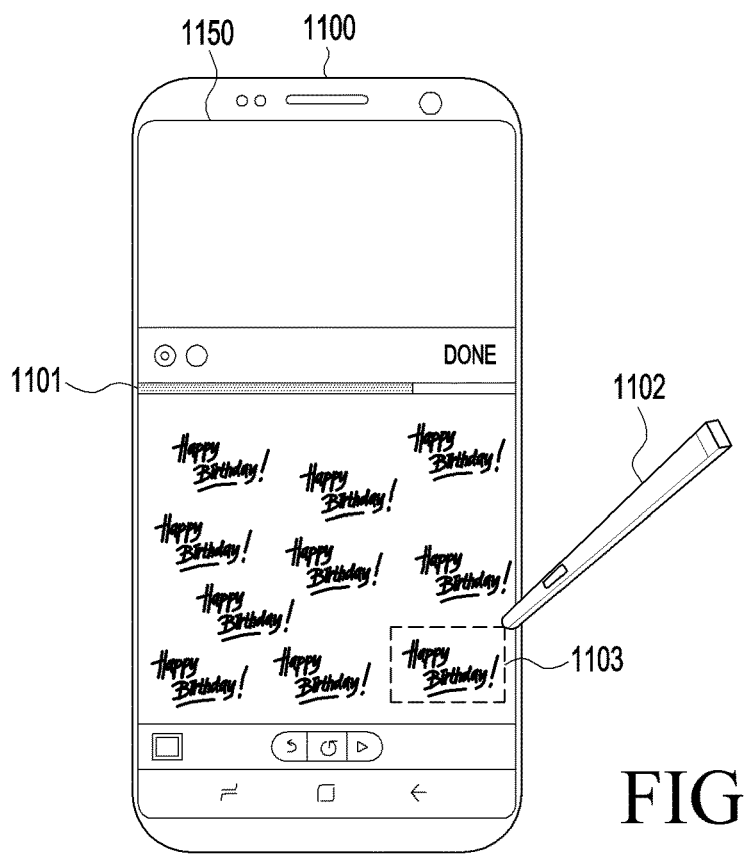
Figure 11C:
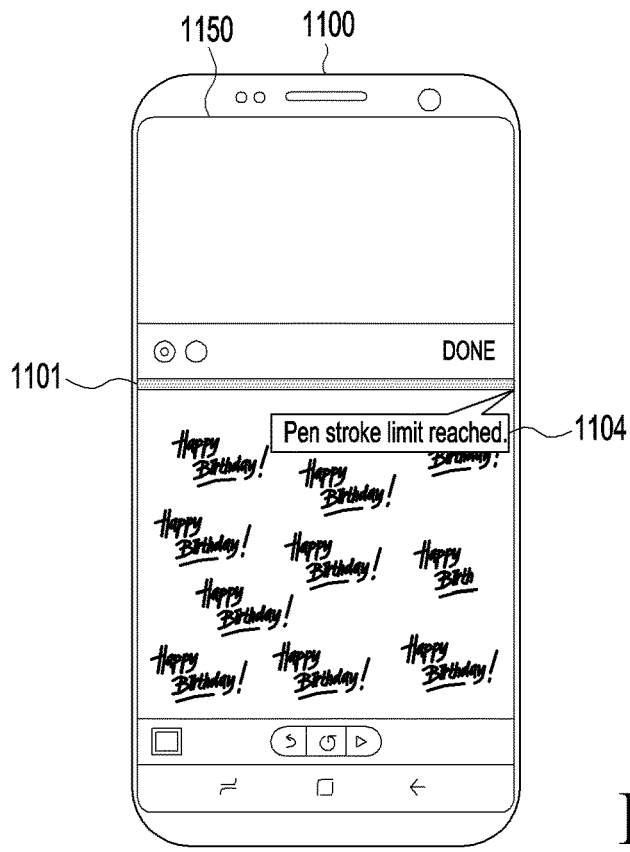

In operation 1003, the processor may determine whether the image file currently being created has a size of a threshold value or greater. The processor may check the size of the image file generated through objects via the pen input tool 1102 or other various user inputs. According to an example embodiment, the processor may display the bar 1101 indicating an image file size in different colors depending on the size of the image file. For example, as illustrated in FIG. 11B, when the size of the image file exceeds 60% of the threshold value, the bar 1101 may be displayed in a different color.

According to an example embodiment, when it is determined that the image file has a size below the threshold value, the processor may continue to receive a user input in operation 1004. According to one example embodiment, when it is determined that the image file has a size of the threshold value or greater or when a user input is continuously received in operation 1004 so that it is determined that the image file has a size of the threshold value or greater, the processor may display that the image file has a size of the threshold value or greater in operation 1005. For example, referring to FIG. 11C, when the size of the image file is the threshold value or greater and thus the bar 1101 indicates the maximum value, the processor may display, on the display, a message 1104 reporting information indicating that the size of the image file is the maximum value or greater using a graphic user interface, such as a popup.

Figure 11D:
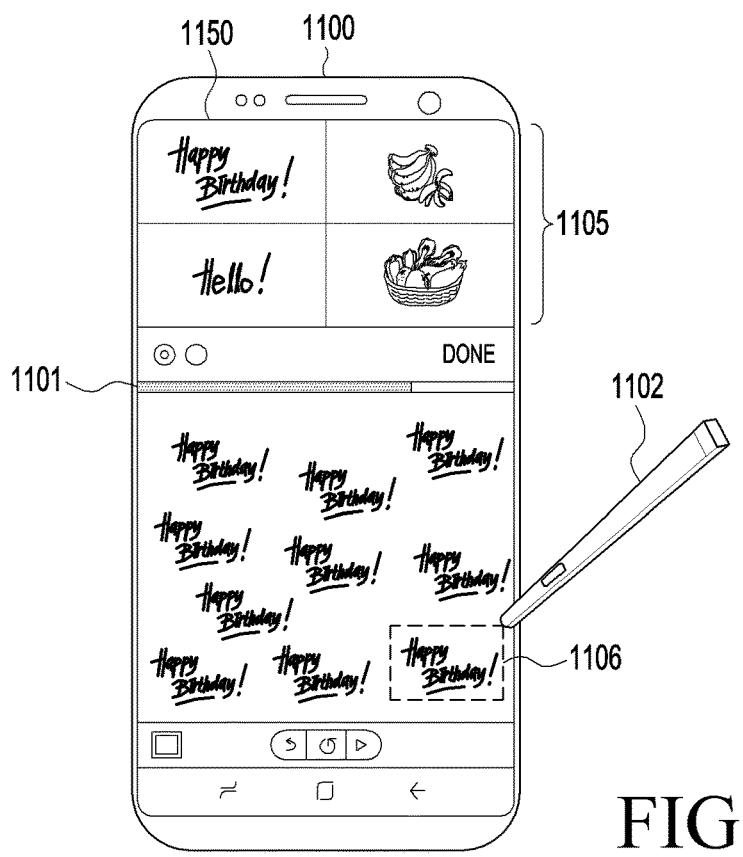

According to various example embodiments, referring to FIG. 11D, the electronic device 1100 (e.g., the electronic device 120 of FIG. 1) may provide a stamp function and may enable input of an object using the stamp function. For example, the processor may provide at least one stamp 1105 on the display and may receive a selection for any one stamp 1106 from the user. When input of the stamp by the user is received, the processor may display the stamp 1106 on a drawing pad. The processor may display a change in the size of the image file via the bar 1101 whenever the stamp 1106 is displayed on the drawing pad.

Figure 12:
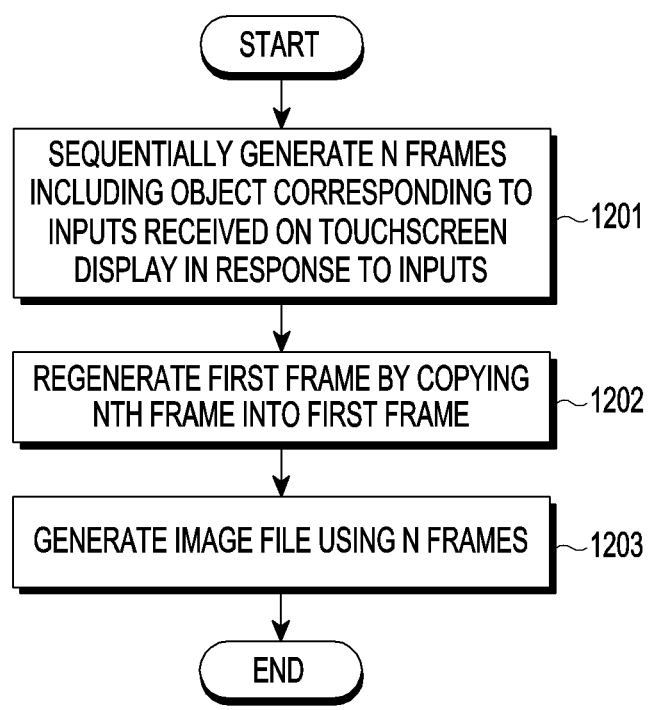
FIG. 12 is a flowchart illustrating a method for an electronic device to generate an image file of a live message according to various example embodiments.
Figure 13:
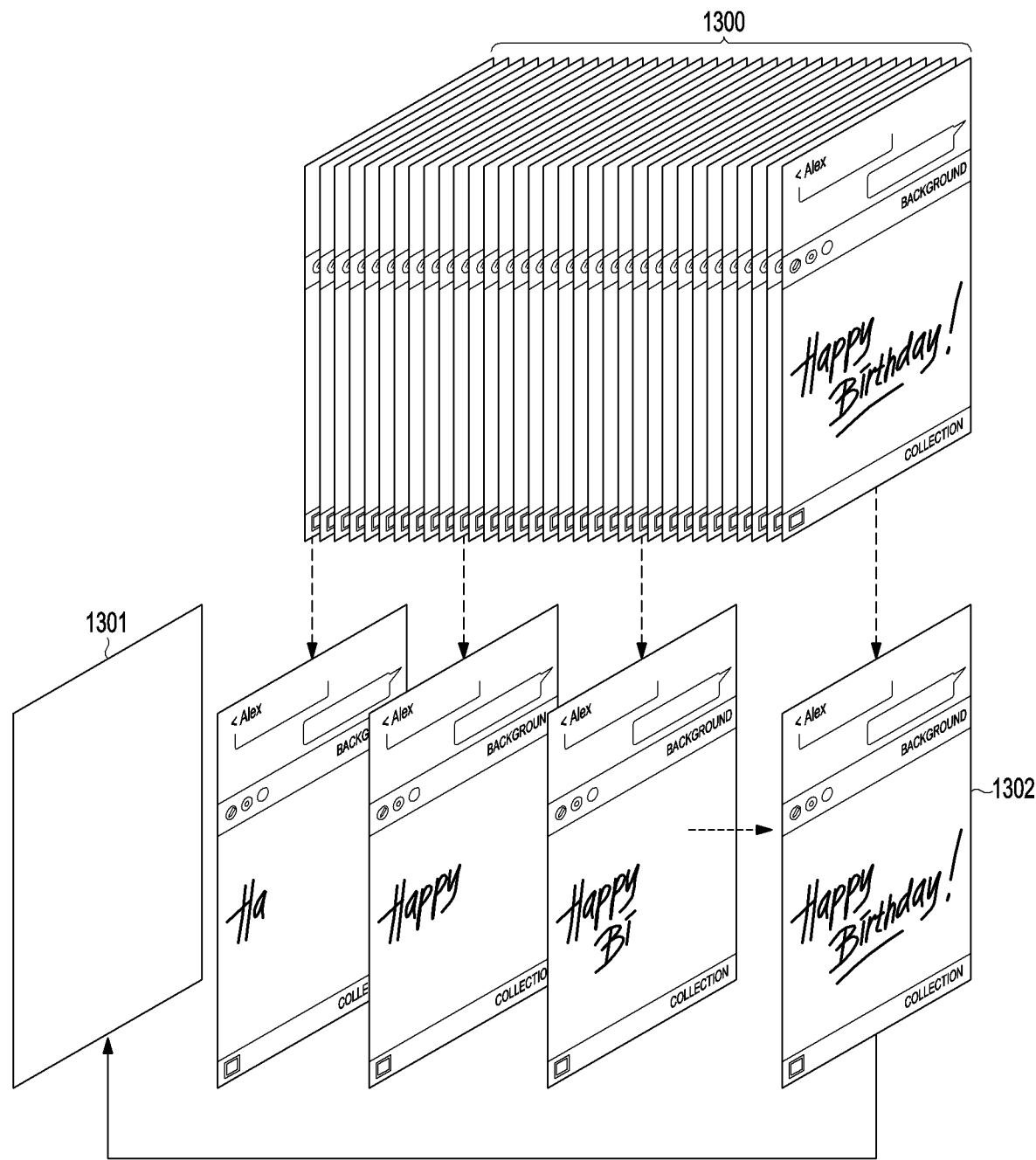
FIG. 13 is a diagram illustrating frames for an electronic device to configure an image file of a live message according to various example embodiments.

FIG. 12 is a flowchart illustrating a method for an electronic device to generate an image file of a live message according to various example embodiments. FIG. 13 illustrates frames forming an image file of a live message generated by an electronic device according to various example embodiments.

In operation 1201, a processor (e.g., the processor 120 of FIG. 1) may sequentially generate n frames including an object corresponding to inputs received on a touchscreen display (e.g., the display device 160 of FIGS. 1 and 2) in response to the inputs. Referring to FIG. 13, while an object is generated according to a user's input, the processor may generate a series of n frames 1300 by time. The processor or another electronic device receiving a live message may play the n frames in order, thereby providing an animation effect as if the object included in the frames 1300 is moving. The processor may generate and store each of the generated frames in a vector format and may separately convert each frame into an AGIF image file. In operation 1202, the processor may regenerate a first frame by copying an nth frame into the first frame. Referring to FIG. 13, the processor may set a first frame 1301 as a dummy frame (empty frame). The processor may regenerate the first frame 1301 by copying an nth frame 1302 into the first frame 1301 set as the dummy frame. The first frame 1301 may be an image including the same object as in the nth frame 1302.

In operation 1203, the processor may generate an image file using the n frames. Referring to FIG. 13, the processor may generate an image file using the n frames including the regenerated first frame 1301. When a processor of an external electronic device receives and plays the image file, the nth frame including the completed object is displayed as the first frame instead of the dummy frame, thus providing a normal preview to the user.

Figure 14:
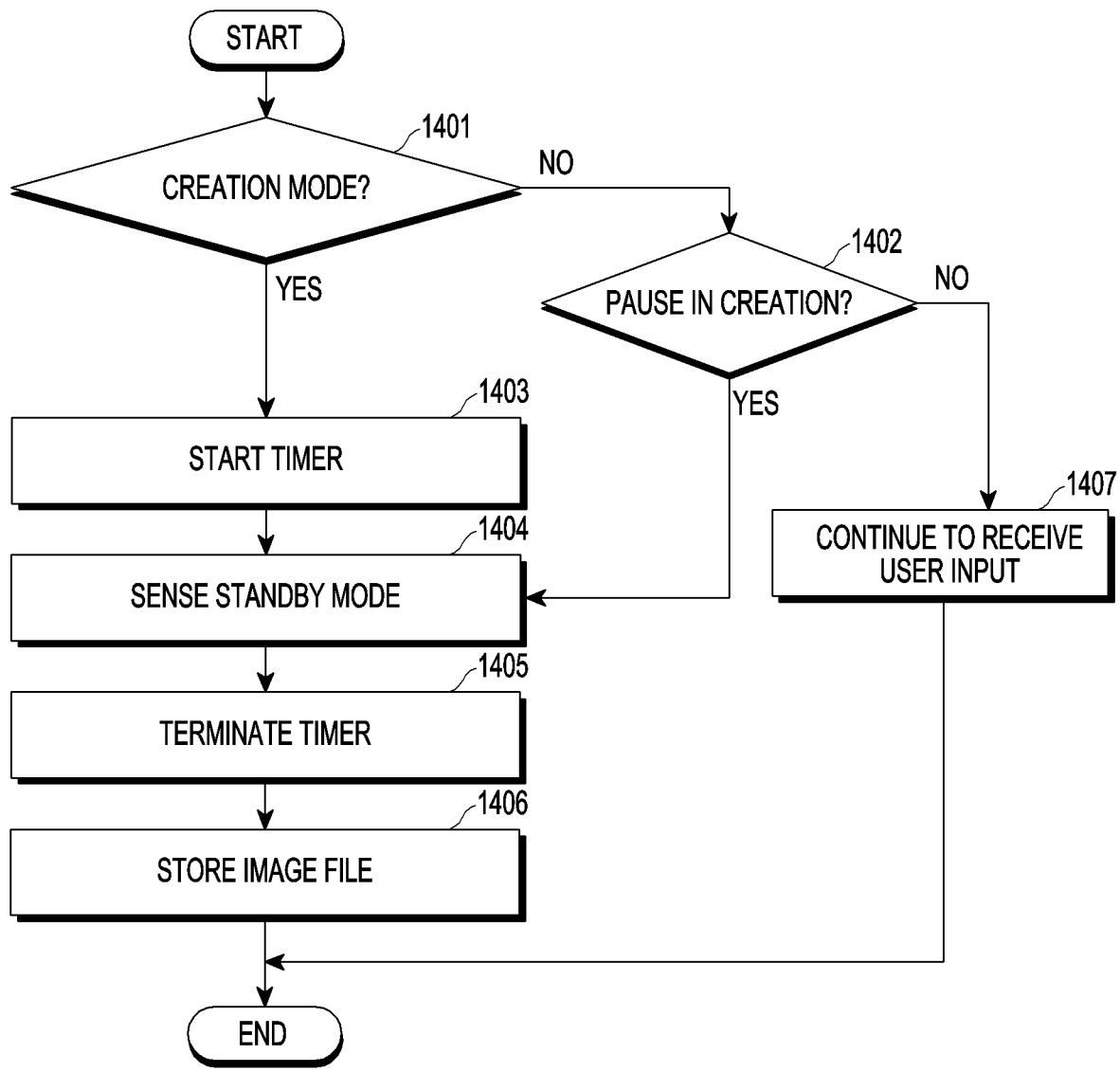
FIG. 14 is a flowchart illustrating a method for an electronic device to generate a live message according to various example embodiments.
Figure 15A:
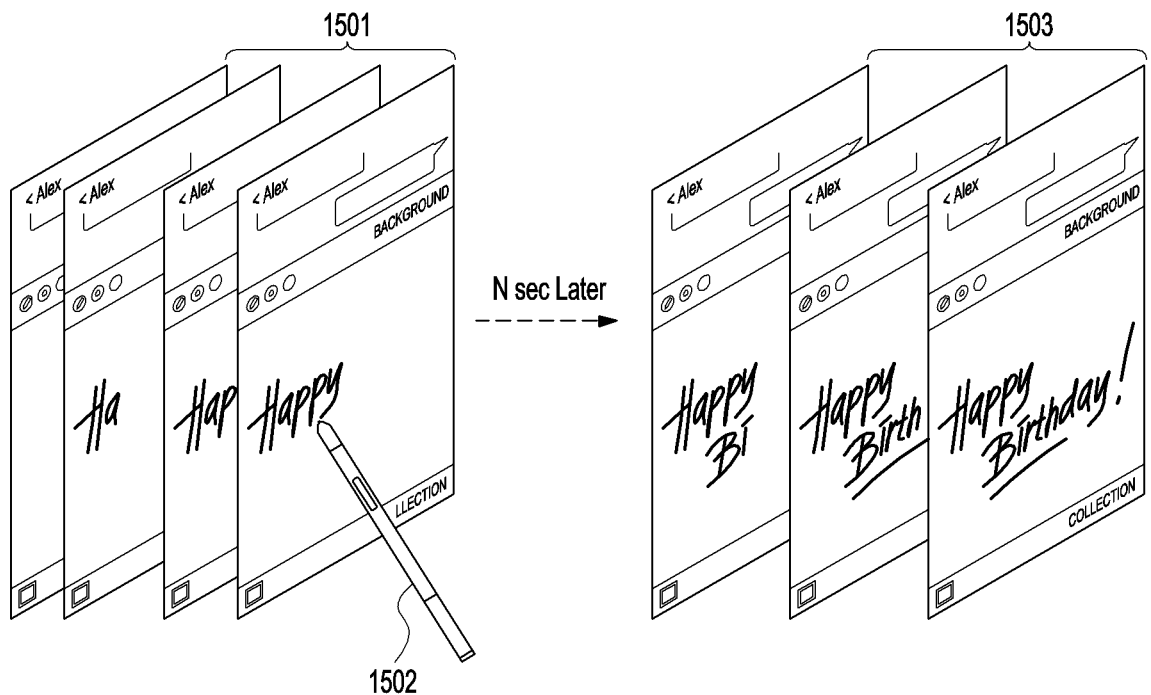
FIGS. 15A and 15B are diagrams illustrating a method for an electronic device to generate a live message when an input is sensed at an interval of time according to various example embodiments.
Figure 15B:
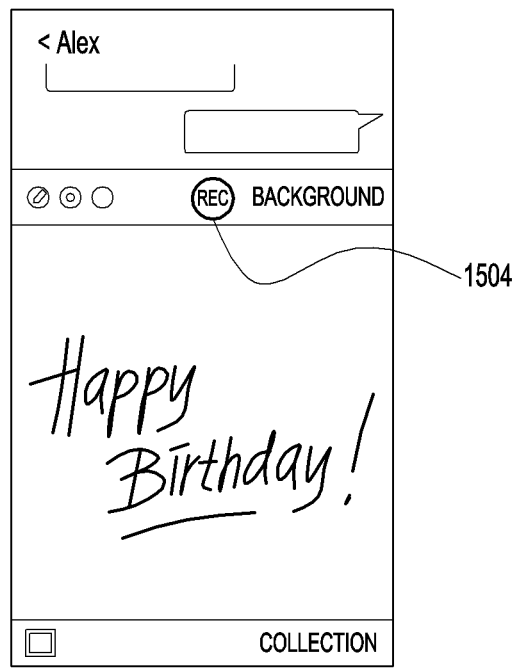

FIG. 14 is a flowchart illustrating a method for an electronic device to generate a live message according to various example embodiments. FIGS. 15A and 15B are diagrams illustrating a method for an electronic device to generate a live message when an input is sensed at an interval of time according to various example embodiments.

In operation 1401, a processor (e.g., the processor 120 of FIG. 1) may determine whether an electronic device (e.g., the electronic device 101 of FIG. 1) is in an object creation mode. The creation mode may be a state in which the processor senses a user input to input an object through a touchscreen display and stores an image of an input object. In operation 1403, the processor may start a timer. Referring to FIG. 15A, when a user input 1502 to create an object is sensed on the touchscreen, the processor may sense the creation mode of the electronic device and may activate a timer for storing an object. The processor may store a first frame set 1501 generated by the user input 1502 as an image according to time while the timer is operating.

The processor may terminate the timer when a touch-up of the user input is sensed. For example, the processor may terminate the timer at a time when the input 1502 from the user is not sensed. In operation 1402, when it is determined that the electronic device is not in the creation mode, the processor may determine whether a pause in creation or a stoppage is sensed through the touchscreen. In operation 1407, when a pause in creation is not sensed, the processor may continue to receive a user input.

In operation 1404, the processor may sense a standby mode of the electronic device. The standby mode may be a state in which input of an object through the touchscreen is not received or a state in which input of an object is received but an image including the object is not stored. When a pause after starting the timer or in the creation mode is sensed or a stoppage of user input is sensed, the processor may sense the standby mode. For example, referring to FIG. 15A, after the processor senses an input about the first frame set 1501 and stores the first frame set 1501, when no user input is received for N seconds, the processor may sense the N seconds as the standby mode for the electronic device.

In operation 1405, the processor may terminate the timer when the standby mode is sensed. Referring to FIG. 15A, when the input about the first frame set 1501 is terminated, the processor may terminate the timer. In operation 1406, the processor may store an image file. For example, after the timer is terminated, the processor may generate images that record an object generated during the operation of the timer and may combine the images to generate an image file. Referring to FIG. 15A, when the user's input is sensed again N seconds after the first frame set 1501 is generated according to the user input, the processor may reactivate the timer. The processor may store a second frame set 1503 generated while a user input is sensed and the timer is reactivated. When the standby mode of the user input 1502 is sensed during generation of the second frame set 1503, the processor may terminate the timer and may store the second frame set 1503.

According to an example embodiment, referring to FIG. 15B, even though no user input is sensed in the electronic device that is in the creation mode according to the user input, the processor does not determine that the electronic device is in the standby mode but may store an image until a period in which no user input is sensed. For example, the processor may display a separate record button 1504 on the display through a user interface and may receive an input via the record button 1504. When the input via the record button 1504 is received, the processor may record an object even while a user input is not sensed, and may generate an image file on objects by from the first user input to the last user input.

Figure 16:
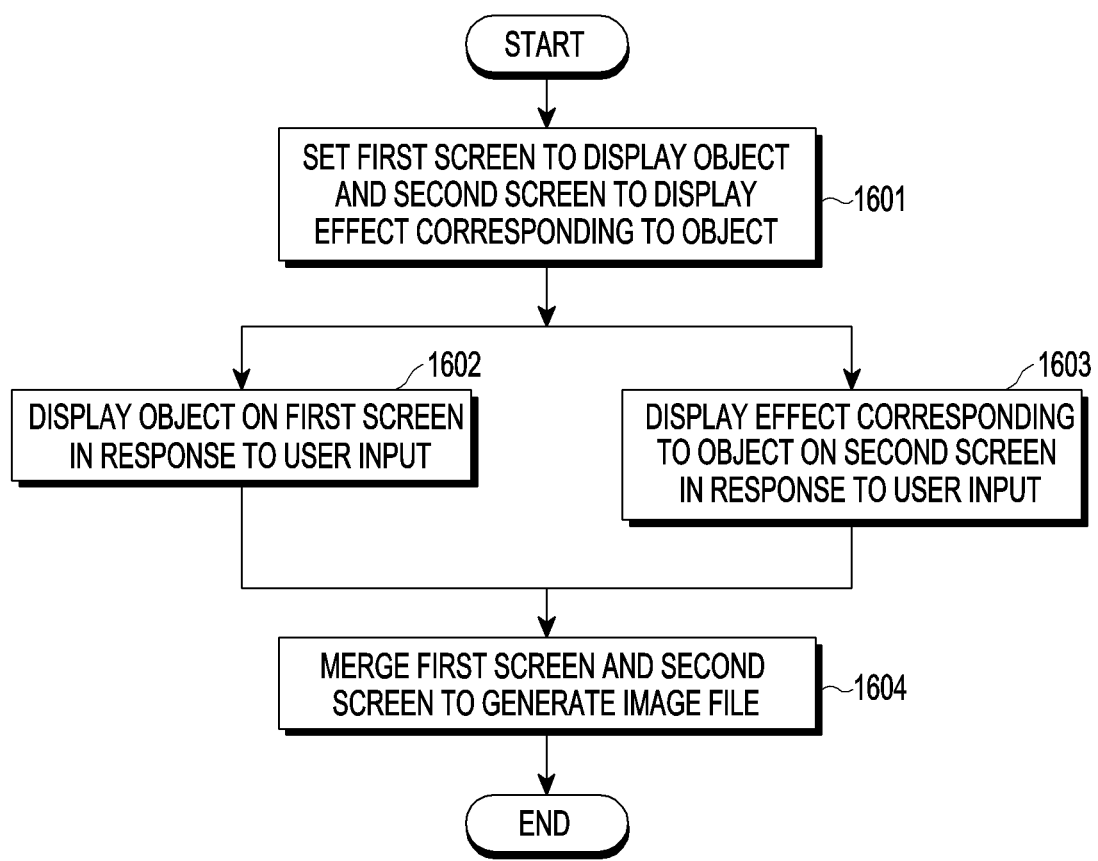
FIG. 16 is a flowchart illustrating a method for an electronic device to display an object and an effect corresponding to the object in accordance with input according to various example embodiments.
Figure 17A:
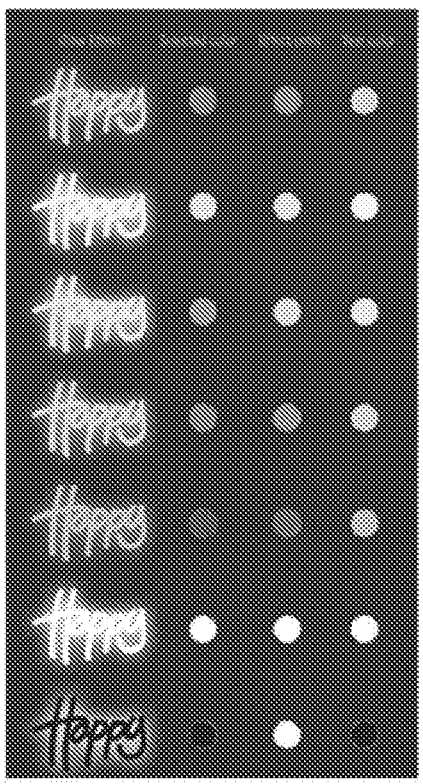
FIG. 17A is a diagram illustrating a configuration for an electronic device to receive a selection of an effect corresponding to an object according to various example embodiments.
Figure 17A:
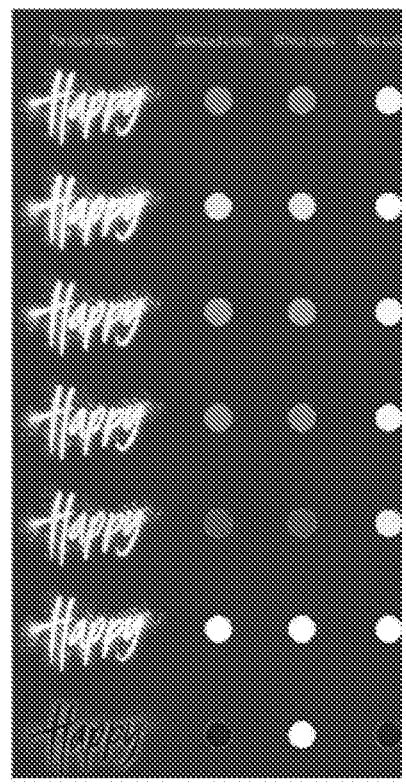
Figure 17B:
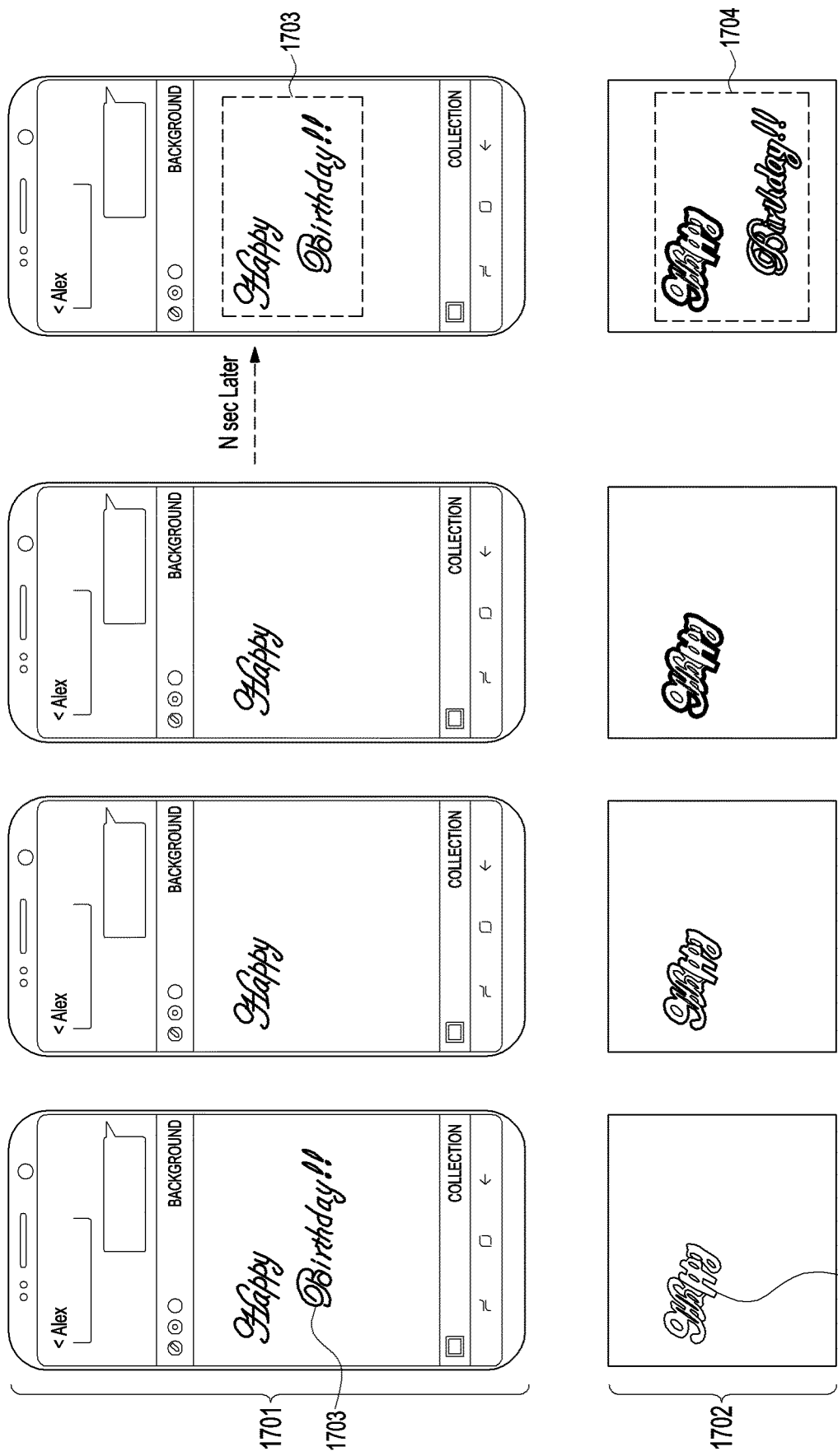
FIG. 17B is a diagram illustrating a configuration for an electronic device to display an object and an effect corresponding to the object in accordance with input according to various example embodiments.

FIG. 16 is a flowchart illustrating a method for an electronic device to display an object and an effect corresponding to the object in accordance with input according to various example embodiments. FIG. 17A is a diagram illustrating a configuration for an electronic device to receive a selection of an effect corresponding to an object according to various example embodiments. FIG. 17B is a diagram illustrating a configuration for an electronic device to display an object and an effect corresponding to the object in accordance with input according to various example embodiments.

In operation 1601, a processor (e.g., the processor 120 of FIG. 1) may set a first screen to display an object and a second screen to display an effect corresponding to the object. Referring to FIG. 17A, an electronic device may receive a selection of an effect corresponding to an object from a user input. The effect may be combined with the object to give the effect of highlighting the object. Referring to FIG. 17B, the processor displays a second screen 1702 to display an effect that the user intends to input corresponding to an object, separately from a first screen 1701 to display an object generated in response to a user input. For example, the effect may be collectively referred to as an effect for highlighting an object 1703 and is not limited to an effect 1704 illustrated in FIG. 17B.

In operation 1602, the processor may display an object on the first screen in response to a user input. In operation 1603, the processor may display an effect corresponding to the object on the second screen in response to a user input. When an input to create an object 1703 is received from the user, the object 1703 may be displayed on the first screen 1701 and an effect 1704 corresponding to the object may be displayed on the second screen 1702. The processor may store the first screen 1701 including the object 1703 as a vector image. A vector image is an image that is processed by a mathematical formula and may collectively refer to a method for representing an image by creating an outline using a point and a Bezier curve and applying a color or a pattern therein. The processor may store the second screen 1702 including the effect 1704 separately from the vector image that stores the first screen 1701.

According to an example embodiment, the processor may convert the vector image into a GIF image. When a drawing pad is displayed, the processor may determine a maximum size that an application can transmit and may determine a period for which a user input is omitted. For example, in FIG. 17B, the processor may determine a maximum transmission size for an application to transmit an image file and may determine a period for which a user input is omitted to adjust the transmission size of an image file. For example, the processor may selectively store only an image corresponding to a set term, rather than storing images generated for the entire time, thereby generating an image file. For example, the processor may determine the size of an image file by adjusting frame rate per second.

According to an example embodiment, the processor may control the object 1703 on the first screen 1701 using a first variable that increases with time and may control the effect 1704 on the second screen 1702 using a second variable separate from the first variable. For example, the first variable may be a variable that increases on the same scale as a time value. The second variable may be a variable that increases on the same scale as a time value but can increase only while a user input (touch-down input to touch-up input) is sensed. For example, when a touch-up is sensed, the first variable increases on the same scale as a time value according to the time value, whereas the second variable does not increase after the touch-up occurs regardless of the time value. Thus, after the touch-up, the object 1703 is continuously displayed on the first screen 1701, while an animation corresponding to the effect on the second screen 1702 may not proceed any more.

Referring to FIG. 17B, when "Birthday!!" is additionally input after "Happy" is input and then a touch-up is sensed, if the second variable increases according to the time value regardless of a touch, "Birthday! !" is added, an effect corresponding to "Happy" may not be displayed when "Birthday! !" is additionally input. According to the embodiment, the second variable may be increased only when a touch is sensed, thereby displaying an effect corresponding to "Happy" on the second screen when "Birthday !!" is additionally input.

In operation 1604, the processor may merge the first screen and the second screen to generate an image file. The processor may merge the stored first and second screens to generate a single image file. Referring to FIG. 17B, the processor may merge the first screen 1701 and the second screen 1702 to generate an image file. The generated image file may include both the object 1703 and the animation effect of the effect 1704 corresponding to the object. The processor may encode the generated image file to be transmitted through the application and may transmit the image file.

Figure 18A:
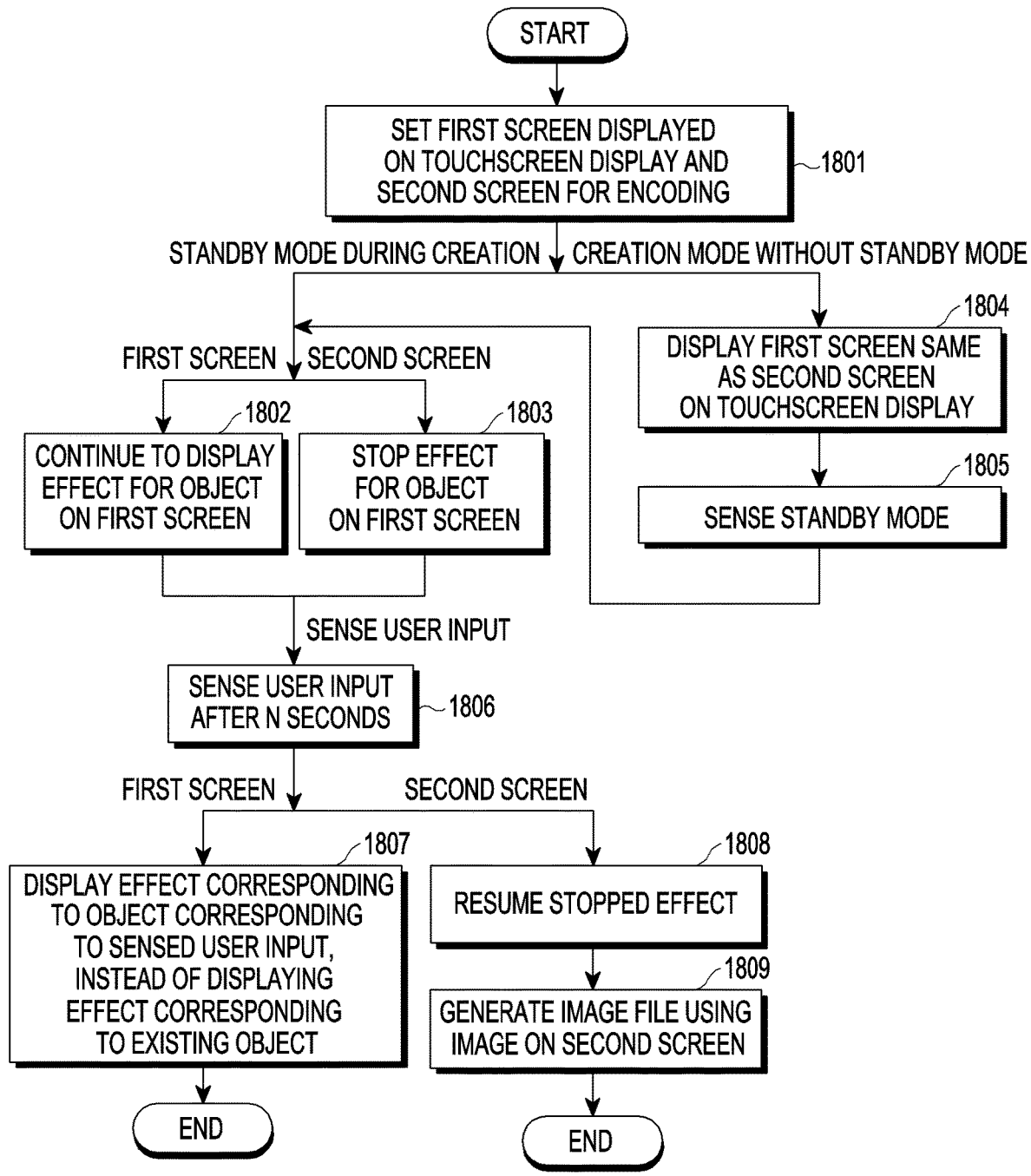
FIG. 18A is a flowchart illustrating a method for an electronic device to display an object and an effect corresponding to the object in accordance with input according to various example embodiments.
Figure 18B:
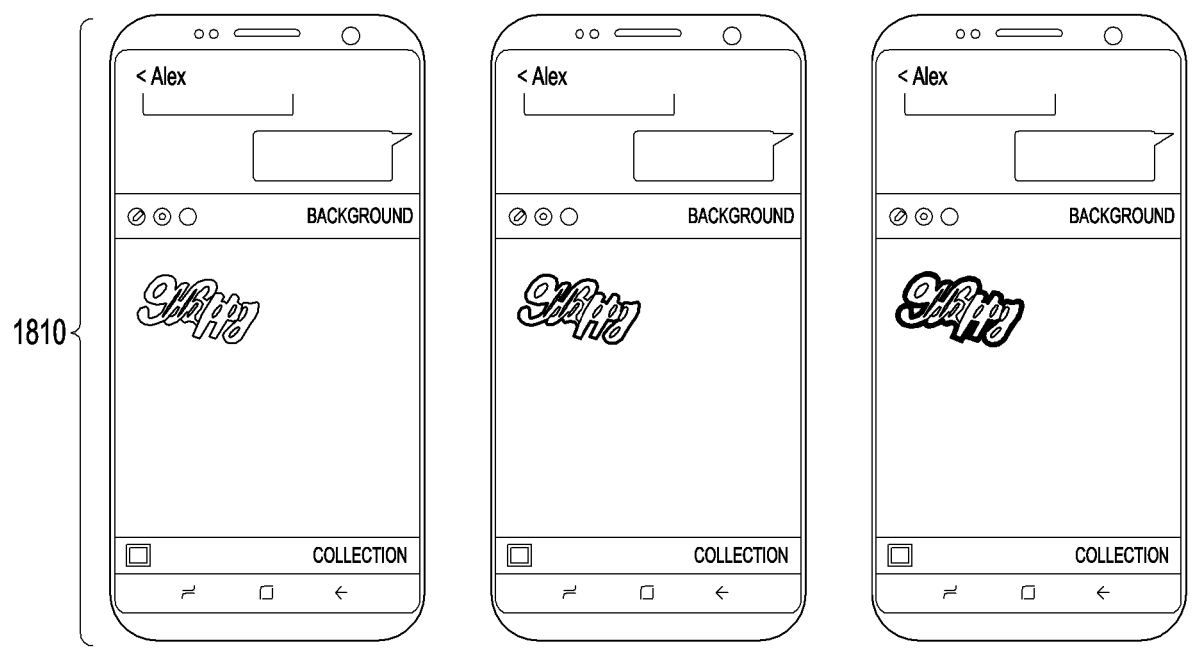
FIGS. 18B, 18C and 18D are diagrams illustrating a method for an electronic device to display an object and an effect corresponding to the object in accordance with input according to various example embodiments.
Figure 18C:
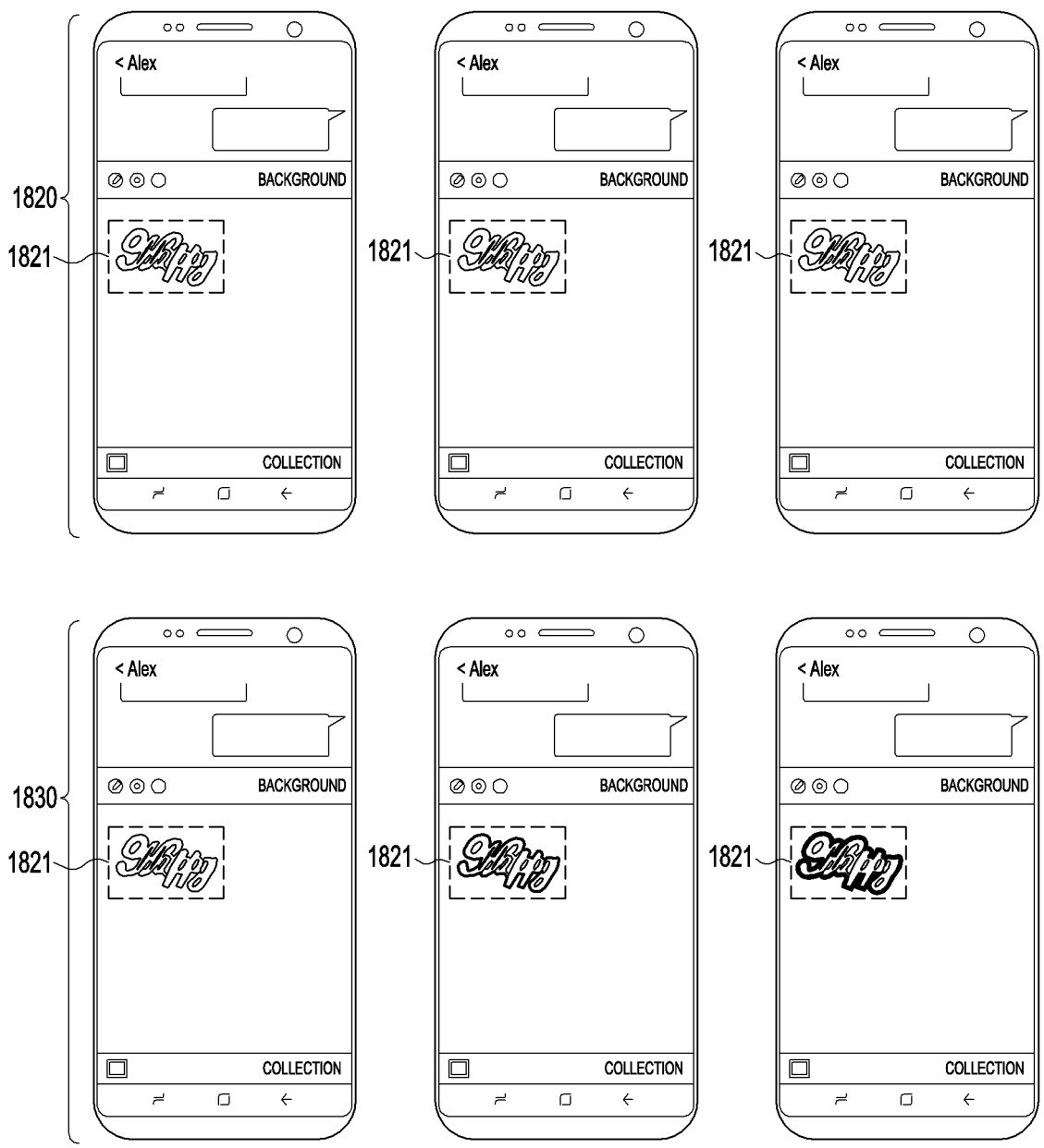
Figure 18D:
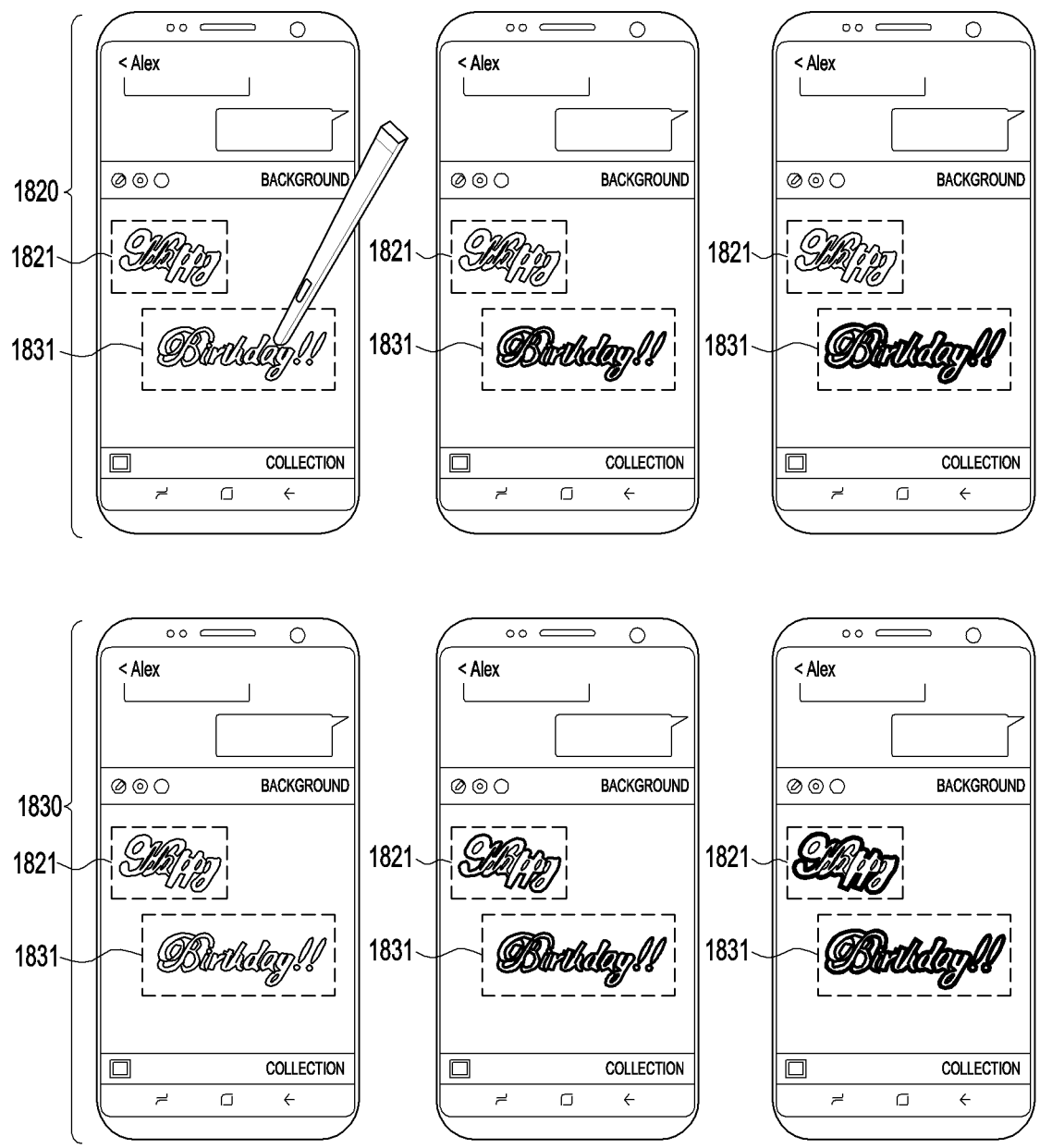

FIG. 18A is a flowchart illustrating a method for an electronic device to display an object and an effect corresponding to the object in accordance with input according to various example embodiments. FIGS. 18B, 18C and 18D are diagrams illustrating a configuration for an electronic device to display an object and an effect corresponding to the object in accordance with input according to various example embodiments.

In operation 1801, a processor (e.g., the processor 120 of FIG. 1) may set a first screen displayed on a touchscreen display and a second screen for encoding an image file. Referring to FIG. 18B, when a user input on a first frame set 1810 is received constantly, the processor may set the first screen and the second screen to be the same screen as the first frame set 1810. The first frame set 1810, which is the same as the first and second screens, may include an object generated corresponding to a user input and an effect for the object.

In operation 1802, when a standby mode is sensed during a creation mode, the processor may continue to display the effect for the object. Referring to FIG. 18C, the processor may continue to display a first object 1821 and an effect corresponding to the first object 1821 in a second frame set 1820. In operation 1803, the processor may stop the effect corresponding to the object on the second screen. Referring to FIG. 18C, the processor may display the first object 1821 in a third frame set 1830. The processor may stop displaying the effect corresponding to the first object 1821.

In operation 1804, when the processor determines that an electronic device (e.g., the electronic device 101 of FIG. 1) is in the creation mode without the standby mode, the processor may display the first frame set 1810, which is the first screen that is the same as the second screen, on the touchscreen display. For example, as illustrated in FIG. 18B, the processor may display the first frame set 1810 on the touchscreen. In operation 1805, the processor may sense the standby mode during the creation mode. When the processor determines that the electronic device is in the standby mode, as illustrated in FIG. 18C, the processor may set the second frame set 1820 and the second screen 1830 in operations 1802 and 1803.

In operation 1806, the processor may sense a user input after N seconds. Referring to FIG. 18D, the processor may sense a user input to generate a second object 1831 in the second frame set 1820 and the third frame set 1830 via the touchscreen display.

In operation 1807, the processor may display an effect corresponding to an object corresponding to the user input sensed after N seconds instead of displaying the effect corresponding to the existing object. Referring to FIG. 18D, the processor may display an effect corresponding to the second object 1831 along with the first object 1821 and the second object 1831, instead of displaying the effect corresponding to the first object 1821 included in the second frame set 1820.

In operation 1808, the processor may resume the effect stopped on the second screen. Referring to FIG. 18D, the processor may display the effect corresponding to the first object 1821 included in the second frame set 1820 along with the first object and may display the effect corresponding to the second object 1831 along with the second object 1831. In operation 1809, the processor may generate an image file using an image on the second screen. The processor may generate an image file using a generated image and may convert the generated image file into a GIF image file.

A method for operating an electronic device 101 according to various example embodiments may include: displaying a user interface of an application on a touchscreen display; displaying a virtual keyboard with the user interface and/or to overlap the user interface; receiving a first input through the virtual keyboard; hiding the virtual keyboard and display a drawing pad with the user interface and/or to overlap the drawing pad upon receiving the first input; receiving a second input through the drawing pad; generating an image file based on the second input; changing the image file based on at least some of information on the application; and transmitting the changed image file through a wireless communication circuit.

According to an example embodiment, the image file may include a series of images obtained based on the second user input.

According to an example embodiment, the image file may be a GIF.

According to an example embodiment, the method for operating the electronic device may include changing, by a processor 120, at least one of the size of the image file, a coding method, and metadata based on at least some of the information.

According to an example embodiment, the application may include at least one of a messaging application, an email application, and a social media service application.

According to an example embodiment, the method may further include, by the processor 120, sequentially generating n frames according to the second user input received on the touchscreen display, copying an object of an nth frame into a first frame, and generating the image file using the n frames.

According to an example embodiment, the method may include, by the processor 120, displaying the size of the image file obtained based on the second input on the touchscreen display and determining whether the size of the image file reaches a threshold value.

According to an example embodiment, the method may include displaying, by the processor 120, information indicating that the size of the image file is the threshold value or greater on the touchscreen display when the size of the image file is the threshold value or greater.

According to an example embodiment, the method may include, by the processor 120, activating a timer when the second user input is sensed, terminating the timer when the second user input is not sensed, and storing the image file obtained while the timer is activated.

According to an example embodiment, the method may include, by the processor 120, setting a first screen and a second screen including a first object obtained corresponding to the second user input and an effect for the first object when the second user input is sensed, displaying, on the first screen, a second object corresponding to the first object and the resumed second user input and an effect corresponding to the second object, displaying, on the second screen, the first object, the effect corresponding to the first object, the second object, and the effect corresponding to the second object when sensing of the second user input is stopped and then resumed, and generating the image file using the second screen.

According to an example embodiment, the information on the application may include at least one of a maximum size of an image file for the application to transmit, an operation implemented upon sharing the obtained image file with another electronic device, and a quality of an effect provided for the obtained image.

A method for operating an electronic device 101 according to various example embodiments may include: receiving a first input; displaying a drawing pad in response to the first user input; receiving a second input through the drawing pad; generating an image file based on the second input; receiving a third input of selecting the application to share the image file; changing the image file based on at least some of information on the application; and transmitting the changed image file through a wireless communication circuit.

According to an example embodiment, the image file may include a series of images obtained based on the second user input.

According to an example embodiment, the method may include changing, by a processor 120, at least one of the size of the image file, a coding method, and metadata based on at least some of the information.

According to an example embodiment, the application may include at least one of a messaging application, an email application, and a social media service application.

According to an example embodiment, the method may include, by the processor 120, sequentially generating n frames according to the second user input received on the touchscreen display, copying an object of an nth frame into a first frame, and generating the image file using the n frames.

According to an example embodiment, the method may include, by the processor 120, displaying the size of the image file obtained based on the second user input and determining whether the size of the image file reaches a threshold value.

According to an example embodiment, the method may include, by the processor 120, activating a timer when the second user input is sensed, terminating the timer when the second user input is not sensed, and storing the image file obtained while the timer is activated.

According to an example embodiment, the method may include setting a first screen and a second screen including a first object obtained corresponding to the second input and an effect for the first object when the second input is sensed, displaying, on the first screen, a second object corresponding to the first object and the resumed second input and an effect corresponding to the second object, displaying, on the second screen, the first object, the effect corresponding to the first object, the second object, and the effect corresponding to the second object when sensing of the second input is stopped and then resumed, and generating the image file using the second screen.

The electronic device according to various embodiments disclosed herein may be various types of devices. The electronic device may, for example, and without limitation include at least one of a portable communication device (e.g., smartphone) a computer device, a portable multimedia device, a portable medical device, a camera, a wearable device, and/or a home appliance, or the like. The electronic device according to one embodiment is not limited to the above described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A or/and B", or "one or more of A or/and B" may include all possible combinations of the items listed. The expression "a first", "a second", "the first", or "the second" used in various embodiments may be used with reference to various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, or firmware, and/or any combinations thereof, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments as described herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is obtained or executed by a compiler or interpreter. The machine-readable storage media may be provided in the form of non-transitory storage media.

According to an example embodiment, a method according to various example embodiments disclosed herein may be included and provided in a computer program product. A computer program product may be traded as a commodity between a seller and a purchaser. A computer program product may be distributed in the form of a machine-readable storage medium (e.g., Compact Disc Read Only Memory (CD-ROM)) or online via an application store (e.g., Play Store™). In the case of online distribution, at least a portion of the computer program product may be temporarily stored or provisionally created at least in a storage medium, such as a memory of a manufacturer server, an application store server, or a relay server.

Each of the components (e.g., modules or programs) according to various example embodiments may be configured as a single entity or a plurality of entities, in which some of the aforementioned subcomponents may be omitted or other subcomponents may be further included. Alternatively or additionally, some components (e.g., modules or a programs) may be integrated into one entity to perform functions equivalent or similar to those performed by the respective components before integration. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been illustrated and described with reference to various example embodiments thereof, it will be understood that the various example embodiments are intended to be illustrative and not limiting. One skilled in the art will understand that various modifications, alternatives and variations will fall within the true spirit and full scope of the disclosure, including that defined, for example, in the appended claims.

What is claimed is:

1. An electronic device comprising:
a housing;
a touchscreen display viewable through a portion of the housing;
a wireless communication circuit disposed in the housing;
at least one processor operatively connected to the touchscreen display and the wireless communication circuit; and
a memory electrically connected to the processor and configured to store a first application comprising a first user interface for transmitting a message through the wireless communication circuit and a second application comprising a second user interface for obtaining an image file,
wherein the memory stores at least one instruction that is configured to, when executed by the at least one processor, cause the at least one processor to:
display the first user interface of the first application on the touchscreen display;
display, on the touchscreen display, a virtual keyboard with the first user interface and/or to overlap the first user interface;
receive a first input through the virtual keyboard;
hide the virtual keyboard and display, on the touchscreen display, the second user interface of the second application including a drawing pad with the first user interface and/or to at least partially overlap the first user interface upon receiving the first input;
receive a second input through the drawing pad;
sequentially obtain n frames based on the second input received on the touchscreen display;
copy an object of an nth frame into a first frame;
obtain, by the second application, an image file based on the second input using the n frames;
change the image file based on at least some of information on the first application, wherein changing the image file includes reducing a file size of the image file and changing the image file to a GIF and/or AGIF including changing content of at least one frame; and
transmit, by the first application, the changed image file through the wireless communication circuit to an external electronic device.

2. The electronic device of claim 1, wherein the image file comprises a series of images obtained based on the second input.

3. The electronic device of claim 2, wherein the image file comprises a Graphics Interchange Format (GIF).

4. The electronic device of claim 1, wherein the at least one instruction, when executed by the at least one processor, causes the at least one processor to change at least one of: a coding method and metadata based on at least some of the information.

5. The electronic device of claim 1, wherein the first application comprises at least one of: a messaging application, an email application, and a social media service application.

6. The electronic device of claim 1, wherein the at least one instruction, when executed by the at least one processor, causes the at least one processor to display, on the touchscreen display, a size of the image file obtained based on the second input and to determine whether the size of the image file reaches a threshold value.

7. The electronic device of claim 6, wherein when the size of the image file is the threshold value or greater, the at least one instruction, when executed by the at least one processor, causes the at least one processor to display information indicating that the size of the image file is the threshold value or greater on the touchscreen display.

8. The electronic device of claim 7, wherein the at least one instruction, when executed by the at least one processor, causes the at least one processor to activate a timer when the second input is sensed, to terminate the timer when the second input is not sensed, and to store the image file obtained while the timer is activated.

9. The electronic device of claim 1, wherein the information on the first application comprises at least one of: a maximum image file size for the first application to transmit, an operation implemented upon sharing the obtained image file with another electronic device, and a quality of an effect provided for the obtained image.

10. An electronic device comprising:
a housing;
a touchscreen display viewable through a portion of the housing;
a wireless communication circuit disposed in the housing;
at least one processor operatively connected to the touchscreen display and the wireless communication circuit; and a memory electrically connected to the processor and configured to store a first application comprising a first user interface for transmitting a message through the wireless communication circuit and a second application comprising a second user interface for obtaining an image file, wherein the memory stores at least one instruction that is configured to, when executed by the at least one processor, cause the at least one processor to:

display the first user interface of the first application on the touchscreen display;

display, on the touchscreen display, a virtual keyboard with the first user interface and/or to overlap the first user interface;

receive a first input through the virtual keyboard;

hide the virtual keyboard and display, on the touchscreen display, the second user interface of the second application including a drawing pad with the first user interface and/or to at least partially overlap the first user interface upon receiving the first input;

receive a second input through the drawing pad;

obtain, by the second application an image file based on the second input;

change the image file based on at least some of information on the first application, wherein changing the image file includes reducing a file size of the image file;

sequentially obtain n frames based on the second input received on the touchscreen display, to copy an object of an nth frame into a first frame, and to obtain the changed image file using the n frames; and transmit, by the first application, the changed image file through the wireless communication circuit to an external electronic device.

11. An electronic device comprising:

a housing;

a touchscreen display viewable through a portion of the housing;

a wireless communication circuit disposed in the housing;

at least one processor operatively connected to the touchscreen display and the wireless communication circuit; and a memory electrically connected to the processor and configured to store a first application comprising a first user interface for transmitting a message through the wireless communication circuit and a second application comprising a second user interface for obtaining an image file, wherein the memory stores at least one instruction that is configured to, when executed by the at least one processor, cause the at least one processor to:

display the first user interface of the first application on the touchscreen display;

display, on the touchscreen display, a virtual keyboard with the first user interface and/or to overlap the first user interface;

receive a first input through the virtual keyboard;

hide the virtual keyboard and display, on the touchscreen display, the second user interface of the second application including a drawing pad with the first user interface and/or to overlap the first user interface upon receiving the first input;

receive a second input through the drawing pad;

obtain, by the second application, an image file based on the second input;

change the image file based on at least some of information on the first application, wherein changing the image file includes reducing a file size of the image file;

when the second input is sensed, set a first screen and a second screen comprising a first object obtained based on the second input and an effect for the first object;

when sensing of the second input is stopped and then resumed, display, on the first screen, a second object corresponding to the first object and obtained based on a resumed second input and an effect corresponding to the second object and display, on the second screen, the first object, the effect corresponding to the first object, the second object, and the effect corresponding to the second object;

obtain the changed image file using the second screen; and transmit the changed image file through the wireless communication circuit to an external electronic device.

12. An electronic device comprising:

a housing;

a touchscreen display viewable through a portion of the housing;

a wireless communication circuit disposed in the housing;

at least one processor configured to be electrically connected to the touchscreen display and the wireless communication circuit; and a memory electrically connected to the processor and configured to store a plurality of first applications for transmitting at least one message through the wireless communication circuit and a second application for obtaining an image file, wherein the memory stores at least one instruction that is configured to, when executed by the at least one processor, causes the at least one processor to:

receive a first input through the touchscreen display;

display, on the touchscreen display, a drawing pad of the second application in response to the first input;

receive a second input through the drawing pad;

sequentially obtain n frames based on the second input received on the touchscreen display;

copy an object of an nth frame into a first frame;

obtain an image file based on the second input using the n frames;

receive a third input of selecting, from the plurality of first applications, an application to share the image file;

change the image file based on at least some of information of the selected application, including changing the image file to a GIF and/or AGIF including changing content of at least one frame; and transmit, by the selected application, the changed image file comprising the GIF and/or AGIF through the wireless communication circuit to an external electronic device.

13. The electronic device of claim 12, wherein the image file comprises a series of images obtained based on the second input.

14. The electronic device of claim 12, wherein the at least one instruction, when executed by the at least one processor, causes the at least one processor to change at least one of: a size of the image file, a coding method, and metadata based on at least some of the information.

15. The electronic device of claim 12, wherein the selected application comprises at least one of a messaging application, an email application, and a social media service application.

16. The electronic device of claim 12, wherein the at least one instruction, when executed by the at least one processor, causes the at least one processor to display, on the touchscreen display, a size of the image file obtained based on the second input and to determine whether the size of the image file reaches a threshold value.

17. The electronic device of claim 12, wherein the at least one instruction, when executed by the at least one processor, causes the at least one processor to activate a timer when the second input is sensed, to terminate the timer when the second input is not sensed, and to store the image file obtained while the timer is activated.

18. An electronic device comprising:
   a housing;
   a touchscreen display viewable through a portion of the housing;
   a wireless communication circuit disposed in the housing;
   at least one processor configured to be electrically connected to the touchscreen display and the wireless communication circuit; and
   a memory electrically connected to the processor and configured to store a plurality of first applications for transmitting at least one message through the wireless communication circuit and a second application for obtaining an image file,
   wherein the memory stores at least one instruction that is configured to, when executed by the at least one processor, cause the at least one processor to:
   receive a first input through the touchscreen display;
   display, on the touchscreen display, a drawing pad of the second application in response to the first input;
   receive a second input through the drawing pad;
   when the second input is sensed, set a first screen and a second screen comprising a first object obtained based on the second input and an effect for the first object;
   when sensing of the second input is stopped and then resumed, display, on the first screen, a second object corresponding to the first object and obtained based on a resumed second input and an effect corresponding to the second object and display, on the second screen, the first object, the effect corresponding to the first object, the second object, and the effect corresponding to the second object;
   obtain the image file using the second screen;
   receive a third input of selecting, from the plurality of first applications, an application to share the image file;
   change the image file based on at least some of information of the selected application, including changing the image file to a GIF and/or AGIF including changing content of at least one frame; and
   transmit, by the selected application, the changed image file comprising the GIF and/or AGIF through the wireless communication circuit to an external electronic device.

19. A method for controlling an electronic device comprising a wireless communication circuit and storing a plurality of first applications for transmitting at least one message through the wireless communication circuit and a second application for obtaining an image file, the method comprising:
   receiving a first input through a touchscreen display;
   displaying, on the touchscreen display, a drawing pad of the second application in response to the first input;
   receiving a second input through the drawing pad, sequentially obtain n frames based on the second input received on the touchscreen display, copy an object of an nth frame into a first frame, and generating an image file based on the second input using the n frames;
   receiving a third input of selecting, from a plurality of first applications, an application to share the image file;
   changing the image file to a GIF and/or AGIF, including changing content of at least one frame, based on at least some of information of the selected application; and
   transmitting, by the selected application, the changed image file comprising the GIF and/or AGIF through wireless communication circuit to an external electronic device.

* * * * *